(12) United States Patent
Hurd et al.

(10) Patent No.: US 11,736,167 B2
(45) Date of Patent: Aug. 22, 2023

(54) METHOD AND DEVICES FOR COMMUNICATION UTILIZING BEAMFORMING

(71) Applicant: Telefonaktiebolaget LM Ericsson (publ), Stockholm (SE)

(72) Inventors: Magnus Hurd, Stockholm (SE); Jonas Karlsson, Upplands Väsby (SE); Zhiming Yin, Danderyd (SE); Svante Bergman, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 17/424,888

(22) PCT Filed: Jan. 22, 2019

(86) PCT No.: PCT/SE2019/050039
§ 371 (c)(1),
(2) Date: Jul. 22, 2021

(87) PCT Pub. No.: WO2020/153881
PCT Pub. Date: Jul. 30, 2020

(65) Prior Publication Data
US 2022/0094407 A1    Mar. 24, 2022

(51) Int. Cl.
*H04B 7/06* (2006.01)
*H04W 16/28* (2009.01)
(52) U.S. Cl.
CPC .......... *H04B 7/0617* (2013.01); *H04W 16/28* (2013.01)

(58) Field of Classification Search
CPC ... H04B 7/0617; H04B 7/0452; H04W 16/28; Y02D 30/70
(Continued)

(56) References Cited

U.S. PATENT DOCUMENTS

| 2009/0202009 A1* | 8/2009 | Sandell | H04L 5/0023 370/329 |
| 2018/0352577 A1* | 12/2018 | Zhang | H04W 74/0816 |
| 2020/0322812 A1* | 10/2020 | Shi | H04W 16/28 |

FOREIGN PATENT DOCUMENTS

WO    2017068356 A2    4/2017

OTHER PUBLICATIONS

International Search Report and Written Opinion for Application No. PCT/SE2019/050039, dated Sep. 27, 2019, 10 pages.
(Continued)

*Primary Examiner* — Sam K Ahn
*Assistant Examiner* — Gina M McKie
(74) *Attorney, Agent, or Firm* — Nicholson De Vos Webster & Elliott LLP

(57) ABSTRACT

A method for time-domain allocation of radio resources in a communication system using beamforming comprises obtaining of a list of wireless devices to be served. Subcarriers and beam directions of a multi-directional beamform are allocated to wireless devices of the list. The beam direction for each wireless device covers a position of that wireless device. The number of allocable subcarriers is limited to fulfil a beam-forming power constraint. This beam-forming power constraint is that the total power of allocated subcarriers, when each allocated subcarrier provides a same effective isotropic radiated power density for a wireless device as would be provided by a single-directional beamform, is within a predetermined power budget.

16 Claims, 15 Drawing Sheets

(58) Field of Classification Search
USPC .......................................................... 375/267
See application file for complete search history.

(56) References Cited

OTHER PUBLICATIONS

Chengkang Pan et al., "On the Downlink Transmission Strategies for MIMO-OFDM Systems," Mar. 2006, pp. 837-844, The Institute of Electronics, Information and Communication Engineers, vol. E89-B, No. 3.

Alexandr M. Kuzminskiy, "Downlink beamforming subject to the equivalent isotropic radiated power constraint in WLAN OFDM systems," 2006, 12 pages, Elsevier B.V.

3GPP TS 38.213 V15.4.0, "3rd Generation Partnership Project; Technical Specification Group Radio Access Network; NR; Physical layer procedures for control (Release 15)," Dec. 2018, 104 pages, 3GPP Organizational Partners.

Communication under Rule 71(3) EPC, EP Application No. 19702130.6, dated Aug. 17, 2022, 126 pages.

Communication under Rule 71(3) EPC, EP Application No. 19702130.6, dated Oct. 31, 2022, 126 pages.

International Preliminary Report on Patentability for Application No. PCT/SE2019/050039, dated Aug. 5, 2021, 7 pages.

\* cited by examiner

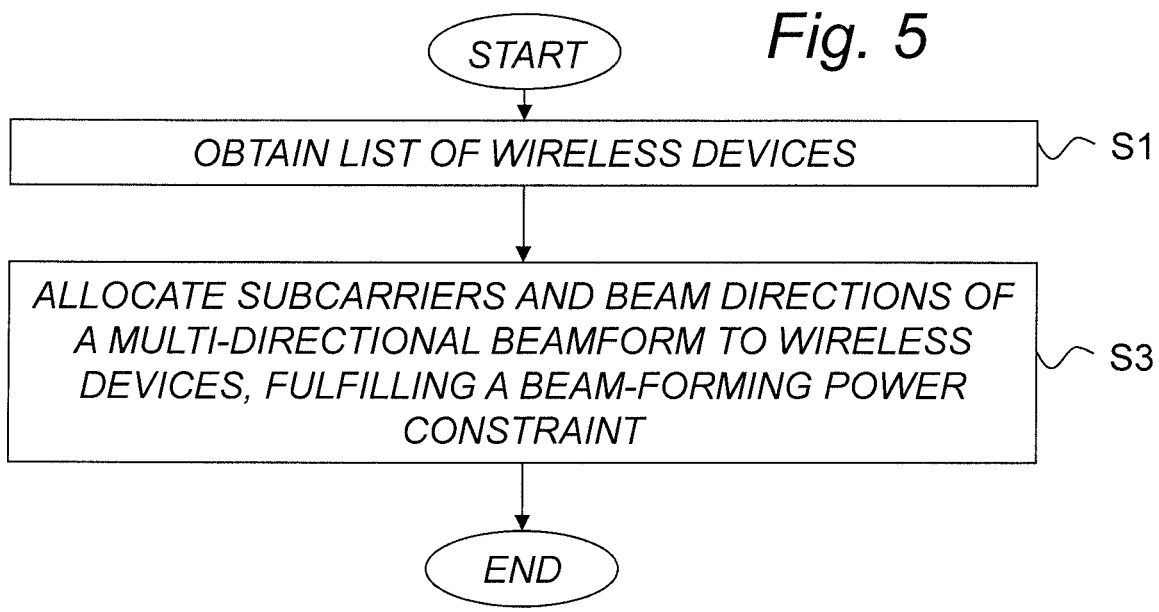
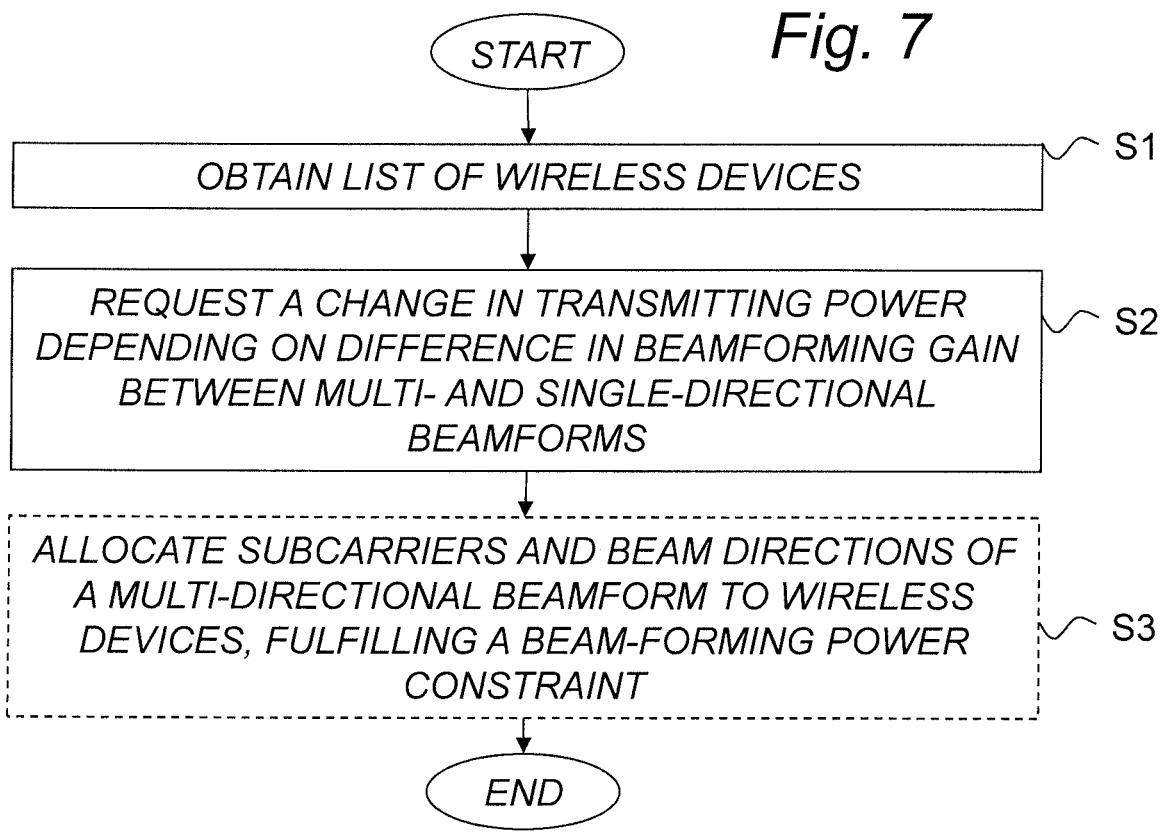

METHOD AND DEVICES FOR COMMUNICATION UTILIZING BEAMFORMING

CROSS-REFERENCE TO RELATED APPLICATIONS

This application is a National stage of International Application No. PCT/SE2019/050039, filed Jan. 22, 2019, which is hereby incorporated by reference.

TECHNICAL FIELD

The proposed technology generally relates to the area of Advanced Antenna Systems (AAS) and time-domain beamforming.

BACKGROUND

Time-domain beamforming, such as analog beamforming, means that one beamform applies to all frequency resources that are parts of a transmission in one time slot. Typically, a set of predefined beamforms are designed to cover a certain spatial area.

Based on User Equipment (UE) feedback, the base station would transmit on one of these beamforms accordingly to communicate a message to the UE. This means that only UEs being associated to the beamform currently selected by the base station can be served at one point in time. The other UEs need to wait until the base station selects a beamform of their preference.

An analogous situation is present for uplink communication. A selected beamform is adapted for receiving signals originating in a certain spatial area. In order for a UE to be able to communicate uplink messages to a base station, the base station has to configure the antenna elements in order to receive signals from the area in which the UE is situated. This means that only UEs being associated to the beamform currently selected by the base station can be served at one point in time. The other UEs need to wait until the base station selects a beamform of their preference.

A part of the design with predefined beamforms is that the power spectral density, or power per subcarrier, is typically determined statically. The intention is that there is a maximum power budget defined for the deployed bandwidth. The determined power per subcarrier would ensure the total power budget is considered and never exceeded even if all frequency resources are allocated.

For a UE to wait until the base station selects a beamform of its preference is adding to the latency of message transmissions to and from that UE. This situation can be especially inefficient if the UE only needs to be served by a small amount of data and if the currently transmitted beamform is not fully utilized in terms of frequency resources. The utilization of the available communication resources may therefore in certain situations be very low.

SUMMARY

It is an object to provide methods and devices for enhancing the radio resource efficiency when utilizing time-domain allocation beamforming.

This and other objects are met by embodiments of the proposed technology.

According to a first aspect, there is provided a method for time-domain allocation of radio resources in a communication system using beamforming. The method comprises obtaining of a list of wireless devices to be served. Subcarriers and beam directions of a multi-directional beamform are allocated to wireless devices of the list. The beam direction for each wireless device covers a position of that wireless device. The number of allocable subcarriers is limited to fulfil a beam-forming power constraint. This beam-forming power constraint is that the total power of allocated subcarriers, when each allocated subcarrier provides a same effective isotropic radiated power density for a wireless device as would be provided by a single-directional beamform, will be within a predetermined power budget.

According to a second aspect, there is provided a network node configured for time-domain allocation of radio resources in a communication system using beamforming. The network node is configured to obtain a list of wireless devices to be served. The network node is further configured to allocate subcarriers and beam directions of a multi-directional beamform to wireless devices of the list. The beam direction for each wireless device covers a position of that wireless device. The number of allocable subcarriers is limited to fulfil a beam-forming power constraint. This beam-forming power constraint is that the total power of allocated subcarriers, when each allocated subcarrier provides a same effective isotropic radiated power density for a wireless device as would be provided by a single-directional beamform, will be within a predetermined power budget.

According to a third aspect, there is provided a computer program comprising instructions, which when executed by at least one processor, cause the processor(s) to obtain a list of wireless devices to be served, and to allocate subcarriers and beam directions of a multi-directional beamform to wireless devices of the list. The beam direction for each wireless device covers a position of that wireless device. The number of allocable subcarriers is limited to fulfil a beam-forming power constraint. This beam-forming power constraint is that the total power of allocated subcarriers, when each allocated subcarrier provides a same effective isotropic radiated power density for a wireless device as would be provided by a single-directional beamform, will be within a predetermined power budget.

According to a fourth aspect, there is provided a computer-program product comprising a computer-readable medium having stored thereon a computer program according to the third aspect.

An advantage of the proposed technology is that a wireless device, e.g. a UE, would experience less latency by allowing multiple wireless devices, e.g. UEs, to be served in a single time frequency block.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 5 is a schematic flow diagram illustrating steps of an embodiment of a method for time-domain allocation of radio resources in a communication system using beamforming;

FIG. 7 is a schematic flow diagram illustrating part steps of an embodiment of a method for uplink time-domain allocation of radio resources in a communication system using beamforming;

DETAILED DESCRIPTION

Throughout the drawings, the same reference designations are used for similar or corresponding elements.

For a better understanding of the proposed technology, it may be useful to begin with a brief overview of time-domain beamforming and analysis of the technical problem.

Figure 1:
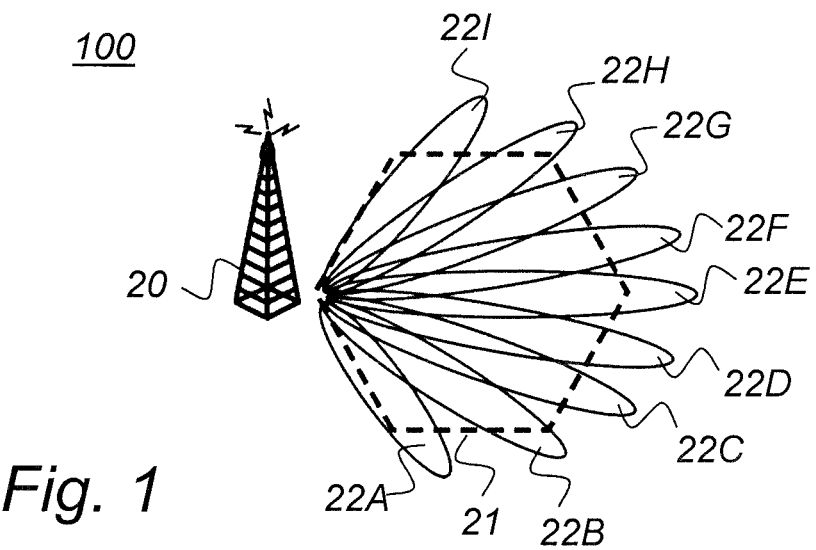
FIG. 1 is a schematic illustration of an embodiment of a predefined grid of beams.

As briefly mentioned above, time-domain beamforming means that one beamform applies to all frequency resources of a time slot of a transmission. As illustrated in FIG. 1, a communication system 100 may have a set of predefined beamforms 22A-22I designed to cover a certain spatial coverage area 21.

The techniques for obtaining beamforming, as such, is well-known in prior art and details of how to obtain beamforms in different directions are therefore not further discussed, since they are well-known for a person skilled in the art. The presently presented technology is also not crucially dependent on the manner in which the beamforms are obtained, and any prior art approach can be utilized.

Based on feedback from wireless devices, e.g. UEs, situated within the coverage area 21, the base station 20 would transmit on one of these beamforms 22A-22I to reach the UE. The UE feedback is typically either formulated as a report indicating a preferred beamform 22A-22I or simply based on a physical measurement of received power per predefined beamform 22A-22I.

Figure 2:
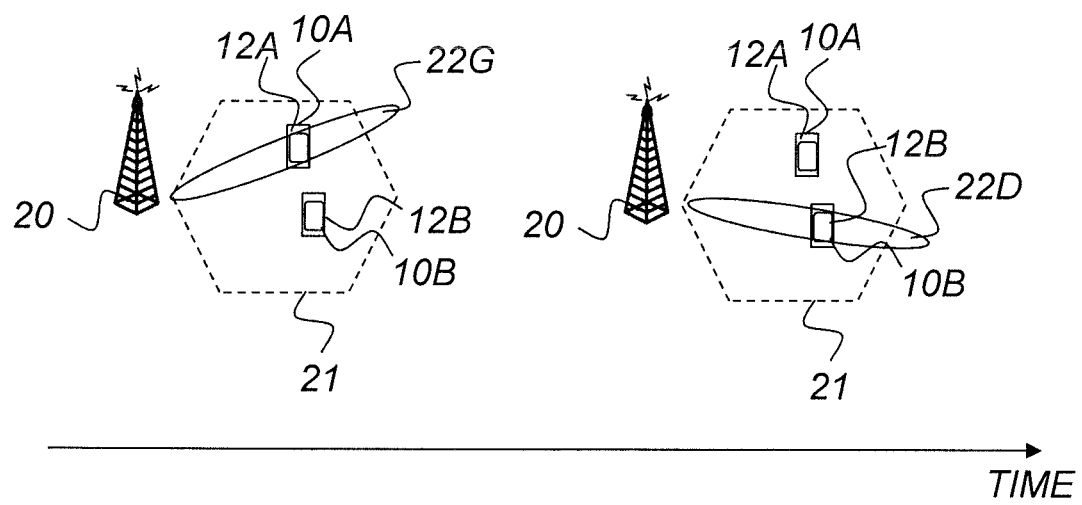
FIG. 2 is a schematic illustration of an embodiment of time-domain beamforming.

As illustrated in FIG. 2, two wireless devices 12A, 12B, in this embodiment UEs 10A, 10B, are present within the coverage area 21. However, selecting one beamform 22G at a first time instant means that only one UE 10A is associated to the beamform 22G currently selected by the base station 20, and consequently, only UE 10A can be served at this first point in time. The other UE 10B needs to wait until the base station 20 selects a beamform 22D of its preference. This beamforming constraint, selecting one direction at a time, is the essence of prior art time-domain beamforming.

Figure 3:
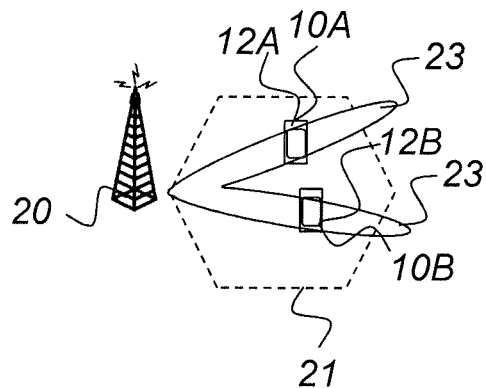
FIG. 3 is a schematic illustration of an embodiment of a multi-directional beamform.

One could relax the restriction to transmit using a beamform with only one resulting direction at a time when UEs associated to different beamforms are present and in need to be served. Different predefined beamforms could e.g. simply be superposed giving rise to multi-directional beamforms. This is schematically illustrated in FIG. 3. Here, a beamform 23 covering communication in more than one direction is used, which means that areas of both UE 10A and UE 10B are covered.

Superposition of single-directional beamforms into a multi-directional beamform, however, results in that some power issues have to be considered. As a result of a superposition, there is more power allocated to each frequency resource compared to a single-directional beamform, which may jeopardize the total power budget. One may then adjust the predefined multi-directional beamforms with a scaling factor such that the total power budget is satisfied.

This scaling factor is in the order of one divided by number of directions of the beamform. Let $P_{sc}$ be the power per subcarrier for the case when one single-direction predefined beamform is applied. The power applied per direction and subcarrier for the case when N directions are present in a beamform would be of the order $P_{sc}/N$. This approach has, however, the drawback that one particular wireless device would sense a different link between the base station and itself depending how many directions the applied beamform has. One link would be experienced if only a single-directed beamform was applied at this point in time, another link would be experienced if a multi-directional beamform was applied.

In each case the UE would receive less power per subcarrier if beamforms with more directions were applied. This would mean that link adaptation needs to be informed about how many directions the planned beamform has for the upcoming transmission. Only then, the modulation and code rate can be selected according to the power intended for a transmission.

Instead, a beam-forming power constraint has to be used, configured such that the total power of allocated subcarriers, when each allocated subcarrier provides a same effective isotropic radiated power density for a UE as would be provided by a single-directional beamform, will be within a predetermined power budget. Such a beam-forming power constraint is fulfilled by limiting the number of allocable subcarriers.

Such an approach will have the advantage that multi-directional time domain beamforming is available while still having UEs experiencing the same Effective Isotropic Radiated Power (EIRP) density compared to single-directional beamforming.

Figure 4:
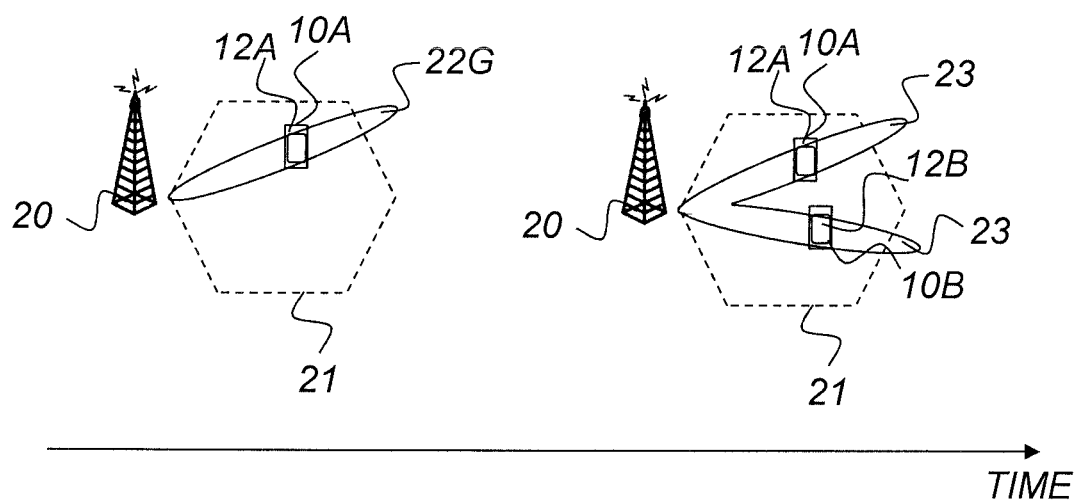
FIG. 4 is a schematic illustration of an embodiment of a multi-directional time-domain beamforming.

As illustrated in FIG. 4, a wireless device 12A, e.g. a UE 10A, served by a single-directed beamform 22G experiences a certain EIRP density. At a later occasion, another wireless device 12B, e.g. a UE 10B, appears in the coverage area 21 and the base station 20 switches to the use of a double-directional beamform 23. However, a power constraint is at the same time applied to the system, resulting in that the UE 10A still experiences a base station transmitting at a same EIRP density as before.

In other words, the typical prior-art restriction to serve only one direction with beamforming at a time is relaxed. This allows the use of multi-directional beamforming. However, the number of frequency resources allocated in each symbol is instead restricted such that the aggregated power of all contributing beamform directions does not challenge the maximum power and so that the UE receives the same power per subcarrier regardless if it is involved in a single-directional beam or a multi-directional beam.

In yet other words, multiple UEs are served in a time-frequency block with a single multi-directional beamform that is tailored based on the grid of single-direction beams or directions, recommended or derived per UE. Power and used bandwidth is allocated within the time-frequency block with the intention that the UE experiences a base station transmitting at the same level of effective (or equivalent) isotropic radiated power density, as would be the experienced EIRP density if the UE was receiving a transmission using only a single one of the specified grid of beams.

That notion of a UE experiencing that the base station is transmitting at a certain EIRP density is sometimes referred to as experienced EIRP density.

FIG. 5 illustrates a schematic flow diagram of steps of an embodiment of a method for time-domain allocation of radio resources in a communication system using beamforming. In step S1, a list of wireless devices to be served is obtained. In step S3, subcarriers and beam directions of a multi-directional beamform are allocated to wireless devices of that list. The beam direction for each wireless device covers a position of that wireless device. The number of allocable subcarriers is limited to fulfil a beam-forming power constraint. The beam-forming power constraint is that the total power of allocated subcarriers, when each allocated subcarrier provides a same effective isotropic radiated power density for a wireless device as would be provided by a single-directional beamform, will be within a predetermined power budget.

The step S3 is preferably performed at least for downlink transmission.

In order to serve multiple wireless devices with a single beamforming weight vector, it is proposed herein to tailor a weight vector that excite multiple directions simultaneously, e.g. to use a multi-peak beamformer. The multi-peak beamformer will inevitable spread more energy spatially compared to a single-peak beamformer, with the consequence of reducing the beamforming (BF) gain for the intended wireless devices. To mitigate this loss of BF gain it is therefore proposed to compensate for the BF loss by a corresponding reduction in allocated bandwidth while maintaining a preserved total transmit power.

A wireless device would experience less latency by allowing multiple wireless devices to be served in a single time frequency block, while the experienced EIRP density still is preserved by not using all available resources in this time frequency block. In other words, the solution offers the option of trading throughput, represented by frequency resources, for latency and coverage. There would be no impact on link adaptation. The same link adaptation procedure could operate regardless how many beam directions that were incorporated in the tailored multi-wireless-device beam at one point in time, c.f. FIG. 4. The proposed solution is especially suitable for scenarios with chatty wireless devices where transmissions are not bandwidth-limited but rather limited in number of available slots, if one slot per wireless-device beam were to be used.

By maintaining the EIRP density when using a tailored multi-wireless-device beam it can be ensured that the wireless device is able to demodulate the data signal. This in turn ensures that the wireless device is in coverage. The reduced bandwidth is more predictable for the scheduler to handle compared to a received power spectral density reduction that would risk non-linear effects at low Signal to Interference and Noise Ratio (SINR) when the link is on the brink of losing coverage.

EIRP density is a measure of the EIRP per frequency resource. The EIRP is a measure that indicates the transmitted power in a specific direction, including the effects of beamforming gain. The EIRP density is proportional to the total radiated power. The EIRP density is furthermore inversely proportional to the allocated bandwidth. Finally, the EIRP density is proportional to the directional beamforming and antenna gain. If a transmission is done with a beamformer that spreads energy spatially it will result in a lower EIRP density compared to a transmission that transmit with a highly directional beamformer. If a transmission is done on a narrow bandwidth it will have a higher EIRP density compared to a wider bandwidth transmission with the same total power.

In the proposed solution, there is a strive to maintain the EIRP density regardless of the number of applied beam directions in a tailored multi-wireless-device beam. In one embodiment, the number of allocable subcarriers is selected to be at most equal to the total number of subcarriers divided by the number of beam directions applied in the multi-directional beamform.

In other words, the scheduler maintains the following beam-forming power constraint:

$$N_{sc} \times N_{bf} \times P_{sc} \leq P_{tot}.$$

$N_{sc}$ is the number of allocable subcarriers, i.e. a limited portion of the totally available subcarriers. $N_{bf}$ is the number of beam directions applied in the multi-directional beamform. This quantity may differ from one symbol or time instant to the next, i.e. it is a variable that is associated with the current selection of beamform. $P_{sc}$ is the EIRP density per subcarrier and $P_{tot}$ is the predetermined power budget. The quantity $P_{sc}$ is desired to be fixed and can be calculated from:

$$P_{sc} = P_{tot} / N_{sc\,tot}.$$

$N_{sc\,tot}$ is the total number of subcarriers of the deployed bandwidth. The quantity $P_{sc}$ can be viewed as an EIRP density, i.e. an EIRP per frequency resource. The intention is that a wireless device, e.g. a UE, shall experience the same EIRP density regardless of how many directions are served at a given time instant.

The $N_{bf}$ is typically inversely proportional to the effective beamforming gain of the multi-UE beam versus the BF gain of the single UE beams. This means that, if two UEs are close together, then $N_{bf}$ can be smaller than the number of distinct beam directions in the multi-directional beam.

Therefore, in another embodiment, the number of allocable subcarriers is selected to be at most equal to the total number of subcarriers multiplied by the relative beamforming gain in the directions of the wireless devices.

A similar, generalized beam-forming power constraint can for such an embodiment be expressed as:

$$N_{sc} \times 1/G_{bf} \times P_{sc} \leq P_{tot}.$$

$N_{sc}$ is also here the number of allocable subcarriers. $G_{bf}$ is the beamforming gain relative to the beamforming gain of a single-directional beamform in the directions of the wireless devices. In other words, $G_{bf}$ is the relative beamforming gain in the directions of the wireless devices that the tailored multi-wireless-device beam was designed for. Note that the relative beamforming gain is greater than $1/N_{bf}$ one in the case of close beam directions as the beamforming gain is compared relative to the single-wireless-device beam. $P_{sc}$ is as above the EIRP density per subcarrier and $P_{tot}$ is the predetermined power budget.

Yet another way to formulate a beamforming power constraint in yet another embodiment is to use the inner product between vectors of beamforming weights per antenna element representing beams. The number of allocable subcarriers is then selected dependent on a normalized factor of inner products of vectors of beamforming weight per antenna element of multi-directional beamform and vectors of beamforming weight per antenna element of a corresponding single UE beam.

In one particular embodiment, the beam-forming power constraint is expressed such that the multi-wireless-device beam, $w_{MU}$, and its corresponding single-wireless-device beams, $w_{UE1}$, $w_{UE2}$, ..., $w_{UEn}$, would be subject to:

$$\max_x N_{sc} \frac{|w_{MU}|^2 |w_{UEx}|^2}{|w_{MU}^H w_{UEx}|^2} P_{sc} \leq P_{tot}$$

$N_{sc}$ is as before the number of allocable subcarriers. $w_{MU}$ is the vector of beamforming weight per antenna element of multi-directional beamform. $w_{UEx}$ are vectors of beamforming weight per antenna element of a corresponding single direction beam serving wireless device x. $P_{sc}$ is the EIRP density per subcarrier and $P_{tot}$ is the predetermined power budget.

The weight vectors $w_{UE1}$, $w_{UE2}$, ..., $w_{UEn}$ can be normalized to unity. Then, the ratio between the square of the norm of the multi-wireless-device beam $w_{MU}$ square of the inner product corresponds to $G_{bf}$. In this more general embodiment, the max operation would compensate for wireless devices getting less gain in the multi-wireless-device beam $w_{MU}$.

In the simplest of embodiments $w_{MU}$ is a superposition of the $w_{UEx}$, possibly with a scalar phase coefficient applied to each UE beam to reduce the peak power per antenna element. This works well when the beam directions are separated. When the directions are close, the $w_{UEx}$'s overlap spatially, and the beamforming gain $G_{bf}$ will be greater than $1/N_{bf}$. This larger beamforming gain manifests into a higher than required experienced EIRP density, and an overly restrictive bandwidth usage. For this case it is therefore convenient to incorporate the above inner product metric for the beamforming power constraint as this metric would adjust the bandwidth for the otherwise higher level of experienced EIRP density.

Note that the inner product metric relies on the assumption that each single UE beamforming weights captures a major part of the signal subspace to the UE of interest, as one may expect if the single UE weights was obtained appropriately.

If directions of the multi-directional beamform are close, one simple embodiment could be not to do multi-directional beamforming for cases when directions are close to each other. Coinciding directions are of course allowed and considered to collapse to one beam.

In yet an alternative embodiment, the beam-forming power constraint is expressed as:

$$N_{sc} \frac{1}{N_{users}} \sum_{x=1}^{N_{users}} \frac{|w_{MU}|^2 |w_{UEx}|^2}{|w_{MU}^H w_{UEx}|^2} P_{sc} \leq P_{tot},$$

$N_{users}$ is the number of wireless devices served in the multi-directional beamform. $N_{sc}$ is the number of allocable subcarriers. $w_{MU}$ is the vector of beamforming weight per antenna element of multi-directional beamform. $w_{UEx}$ are vectors of beamforming weight per antenna element of a corresponding single direction beam serving wireless device x. $P_{sc}$ is the EIRP density per subcarrier and $P_{tot}$ is the predetermined power budget.

In a previous embodiment based on max operation, it is the wireless device with beamforming gain that determines the applied power per subcarrier. In the embodiment closest above it is the average beamforming gain that determines the applied power.

In order for selecting a proper multi-directional beamform, different approaches can be used. One embodiment is schematically illustrated in the form of a flow diagram in FIG. 6.

The scheduler could operate in each symbol as follows. Initialize $N_{sc}$=0 and $N_{bf}$=0. For simplicity, it is here assumed that the first version of the beamforming power constraint based on number of directions used in the applied beamform. The present embodiment of step S3 of allocating subcarriers and beam directions of a multi-directional beamform to wireless devices, e.g. UEs, starts with the step S31, in which subcarriers and a beam direction of a single-directional beamform is allocated to a first wireless device of the wireless devices in the present list. Next, examine a next wireless device to be served. Is that wireless device associated to a new beam direction or an already allocated beam direction? Typically, the wireless device has recommended the beam direction to the base station. Therefore in step S32, an associated beam direction of a next wireless device of the list of wireless devices is determined If it is concluded in step S33 that the present beamform covers also the direction of the next wireless device, it is check in step S35 if there are any subcarriers available to the wireless device such that beamforming power constraint is fulfilled. If this is the case, in step S36, subcarriers and a beam direction of a current beamform is allocated to the next wireless device. The quantity $N_{sc}$ is updated accordingly. What subcarriers and beam directions have been allocated are registered. Preferably, the method then returns to step S32. The allocating is thus performed if the associated beam direction of the next wireless device coincides with a beam direction of a current beamform and a number of allocable non-allocated subcarriers fulfills the requests of the next wireless device.

If it is concluded in step S33 that the associated beam direction of the next wireless device does not coincide with a beam direction of a current beamform, the procedure continues to step S34, where a tentative new multi-directional beamform is selected. The tentative new multi-directional beamform has beam directions covering all allocated wireless devices as well as the next wireless device. The quantity $N_{bf}$ is calculated accordingly. The process then continues to step S35, where it is checked if there are any subcarriers available to the wireless device such that beam-forming power constraint is fulfilled, now with the new tentative beamform. If this is the case, in step S36, the tentative new multi-directional beamform is accepted as the beamform to be used and subcarriers and beam direction are allocated to the wireless device. The quantity $N_{sc}$ is updated accordingly. What subcarriers and beam directions have been allocated are registered. Thus, in other words, if the tentative new multi-directional beamform is selected, the step of allocating subcarriers and beam directions of a multi-directional beamform to said wireless devices is performed with the tentative new multi-directional beamform, if a number of allocable subcarriers of the tentative new multidirectional beamform fulfilling the beam-forming power constraint is larger or equal to the subcarrier requests of the allocated wireless devices and the next wireless device.

The procedure is preferably repeated for next wireless device until the subcarriers has been exhausted, i.e. the beamforming power constraint disallows any further allocation. In other words, step of determining, and either the step of allocating subcarriers and beam direction of a current beamform to the next wireless device or the step of selecting a tentative new multi-directional beamform, until a number of allocable subcarriers is smaller than the subcarrier requests of the allocated wireless devices and the next wireless device.

The approach of keeping experienced EIRP density of each direction the same regardless of being transmitted in single-direction or multiple-direction context is advantageous. Note that the procedures above maintaining the beamforming power constraint could apply for each subset of frequency resources, being part of the full frequency range deployed. All subsets together could e.g. constitute an Orthogonal Frequency-Division Multiplexing (OFDM) symbol, representing the full frequency range. Typically, the proposed solution is less useful when the full frequency range is divided into many subsets.

To estimate the channel matrix, UEs measure on special reference signals are required. These reference signals can in New Radio (NR) be represented by Synchronization Signal Blocks (SSBs) and/or Channel State Information Reference Signal (CSI-RS). To avoid confusion, the reference signals should be transmitted using only one beam. Then the base station can non-ambiguously interpret the feedback from the UE as being associated to one specific beam. This non-ambiguity is important since the base station plans future transmissions according to what the UE measures on the reference signals. Demodulation Reference Signals (DMRS) on the other hand need to be transmitted exactly as the Physical Downlink Shared Channel (PDSCH).

Basically, this means that for symbols containing SSB or CSI-RS only one beam is allowed, meaning that $N_{bf}=1$. Other than that, the procedure outlined above applies. If frequency resources remain, additional transmissions are allowed as long they use the same beam as the applicable reference signal. Examples when this may happen is for early messages as Msg2/Msg4. Msg2 is the Random Access Response. These messages are likely to be transmitted by the same broad beamform as the SSB. Another example would be PDSCH after the base station, by means of a P2 procedure, has selected a narrow beam to serve the UE. This can be transmitted in a symbol providing a CSI-RS as long as the beam representing the PDSCH and the beam representing the CSI-RS match.

In one realization of the idea, EIRP density may be subject to an upper bound due to regulatory requirements. Typically these requirements involve the avoidance of out-of-band emissions. In a situation where the EIRP density, subject to the beamforming power constraint, violates the upper bound one may allocate the transmission in the middle of the deployed bandwidth, avoiding band edges.

For uplink transmission, a predetermined global power budget is of no importance. The UEs transmit in respective directions and the base station utilizes the beamform to receive signals from one or several directions, and each UE is managing its power budget according to uplink power control e.g. as expressed in the standard 3GPP TS 38.213. Due to the ability to receive from several directions simultaneously, the experienced SINR typically becomes worse since the beamforming gain is thought of as distributed over several directions. To compensate for this, the UEs may be requested to change their transmitting power when changing beamform.

In FIG. 7, a step S2 is optionally intended for uplink transmission. In this step, a change in transmitting power of a UE is requested of $\Delta N_{bfgain}$ in each allocable subcarrier when transmitting at a multi-directional beamform, where $\Delta N_{bfgain}=10 \log N_{bf}$ corresponds to the difference in beamforming gain between the multi-directional beamform in a present time slot and the beamforming gain of a single-directional beamform.

In cases, where the requested transmitting power becomes too large, different kinds of limitations may be performed. In one embodiment, also for uplink transmission, the number of allocable subcarriers is limited to fulfil the beam-forming power constraint.

In fact, there is also in uplink power control, as explained e.g. in the standard 3GPP TS 38.213, a power budget considered by each UE. Accordingly, the beamforming power constraint shall now in uplink be considered per UE. When receiving in a multi-directional beamform context, the base station may reduce the number of Physical Resource Blocks (PRBs) allocated to a certain UE in case its power budget is exceeded after UE has been instructed to increase its power per subcarrier. Therefore in a further preferred embodiment, this limitation of the number of allocable subcarriers in uplink transmission is performed in dependence of available transmitting power of the UEs.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, Internet of Things (IoT) device, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a network node configured for time-domain allocation of radio resources in a communication system using beamforming. The network node is configured to obtain a list of UEs to be served. The network node is further configured to allocate subcarriers and beam directions of a multi-directional beamform to UEs of the list. The beam direction for each UE covers a position of that UE. The number of allocable subcarriers is limited to fulfil a beam-forming power constraint. The beam-forming power constraint is that the total power of allocated subcarriers, when each allocated subcarrier provides a same effective isotropic radiated power density for a UE as would be provided by a single-directional beamform, will be within a predetermined power budget.

The allocation of subcarriers and beam directions are preferably performed at least for downlink transmission.

Figure 8:
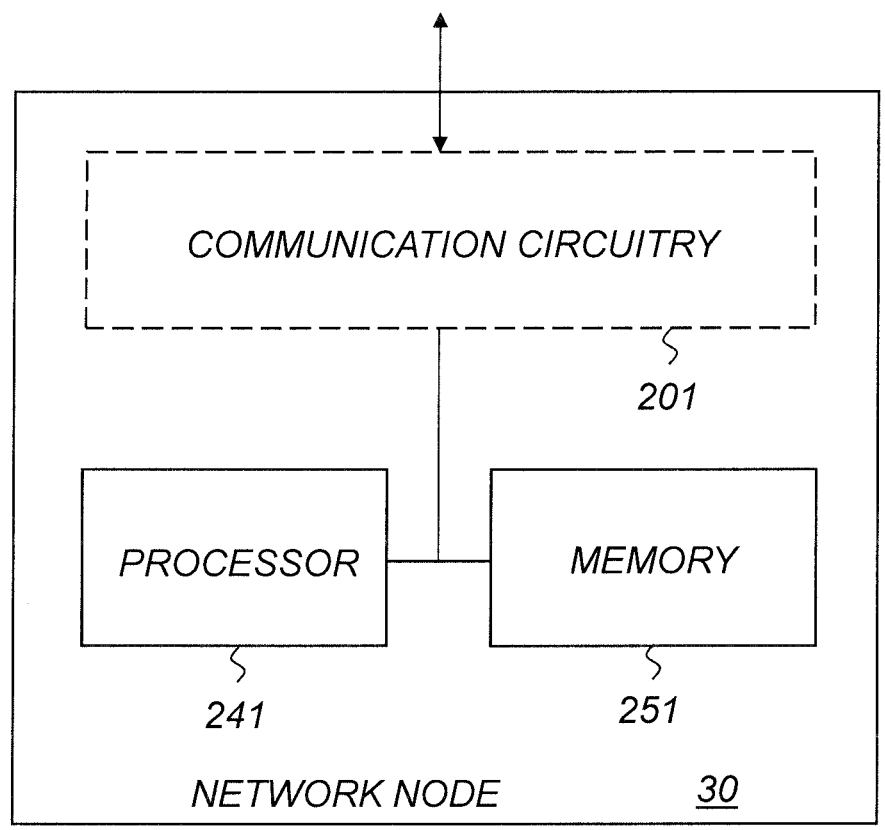
FIG. 8 is a schematic block diagram illustrating an embodiment of a network node.

FIG. 8 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241, whereby the processor 241 is operative to obtain the list of UEs to be served and to the allocate subcarriers and beam directions of the multi-directional beamform to UEs of the list.

The network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s).

Figure 9:
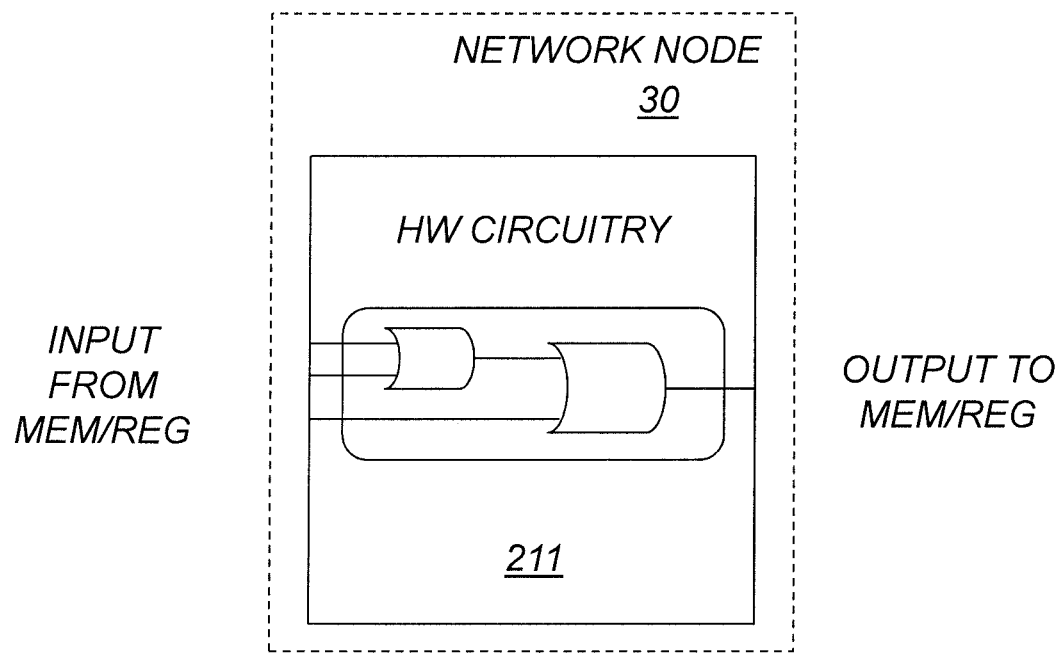
FIG. 9 is a schematic block diagram illustrating an embodiment of a network node based on a hardware circuitry implementation.
Figure 10:
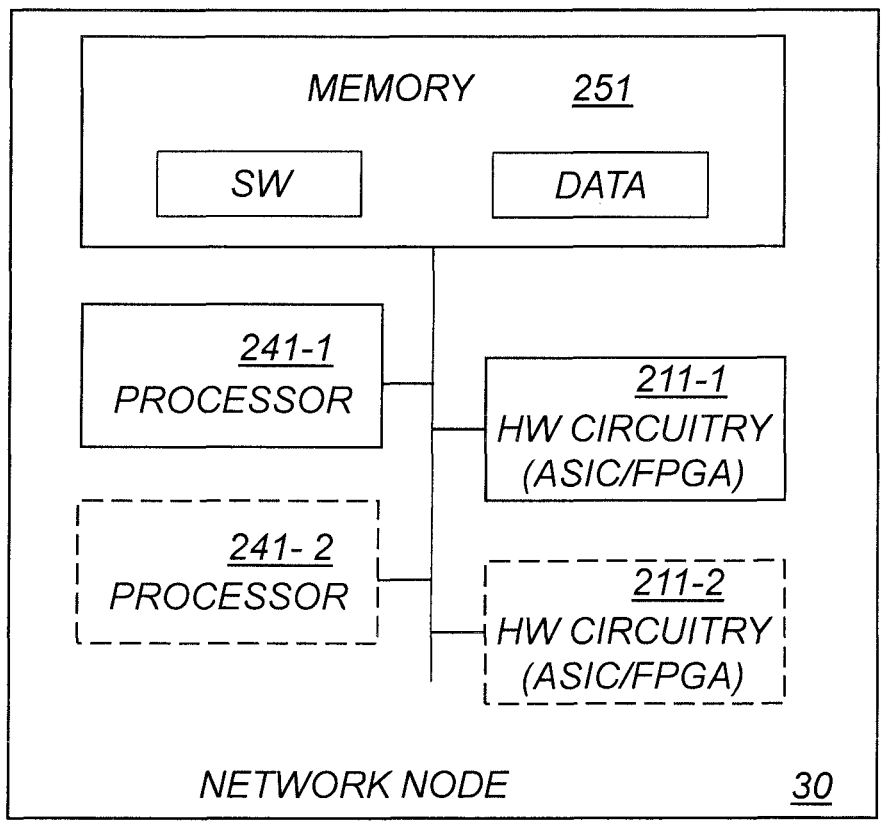
FIG. 10 is a schematic block diagram illustrating another embodiment of a network node based on combination of both processor and hardware circuitry.

FIG. 9 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 6:
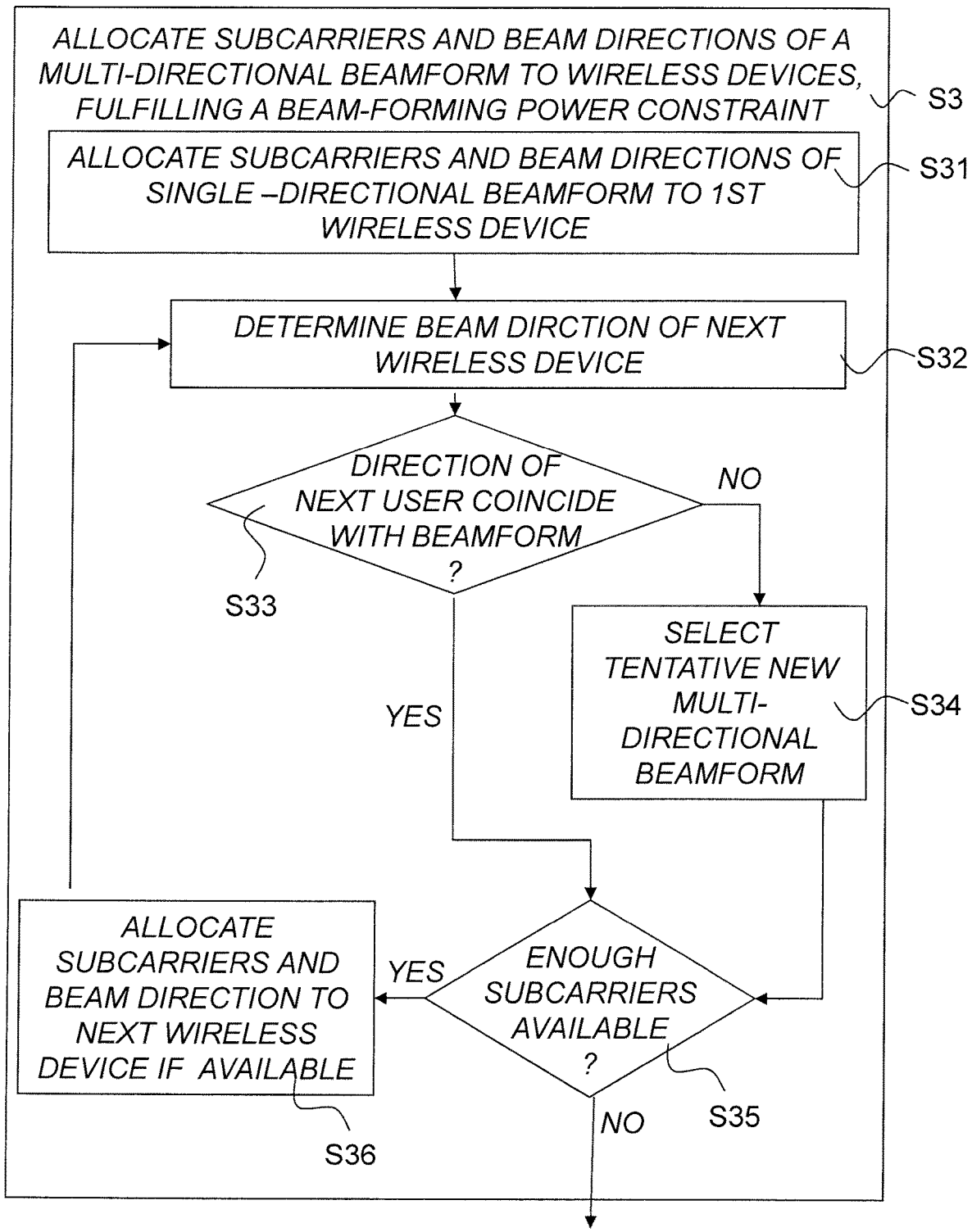
FIG. 6 is a schematic flow diagram illustrating part steps of an embodiment of a step for allocating subcarriers and beam directions.

FIG. 6 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 11:
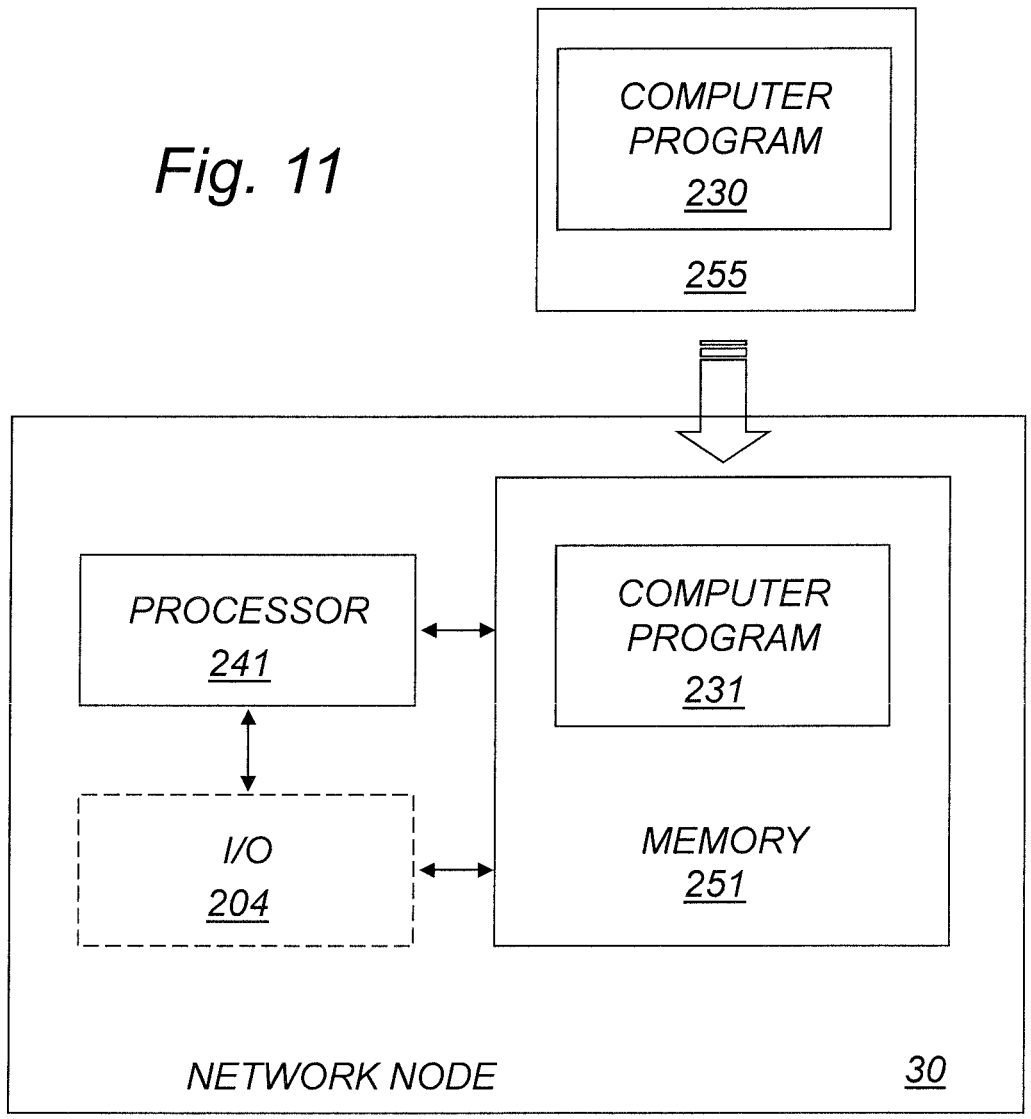
FIG. 11 is a schematic diagram illustrating an embodiment of a computer-implementation of a network node.

FIG. 11 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to obtain a list of UEs to be served, and to allocate subcarriers and beam directions of a multi-directional beamform to UEs of that list. The beam direction for each UE covers a position of that UE. The number of allocable subcarriers is limited to fulfil a beam-forming power constraint. The beam-forming power constraint is that the total power of allocated subcarriers, when each allocated subcarrier provides a same effective isotropic radiated power density for a UE as would be provided by a single-directional beamform, will be within a predetermined power budget.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 12:
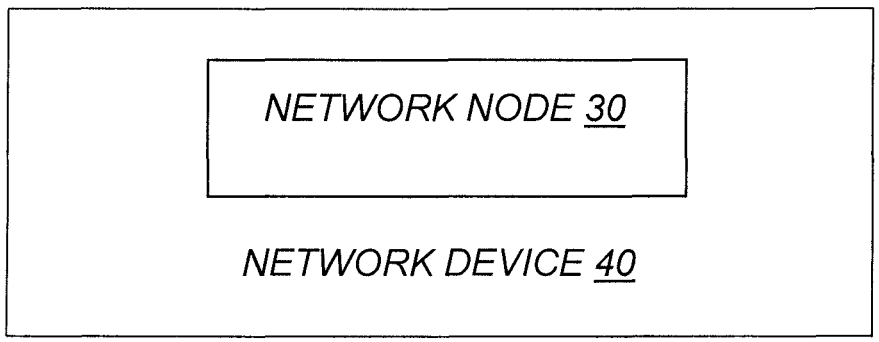
FIG. 12 is a schematic block diagram illustrating an embodiment of a network device.

FIG. 12 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
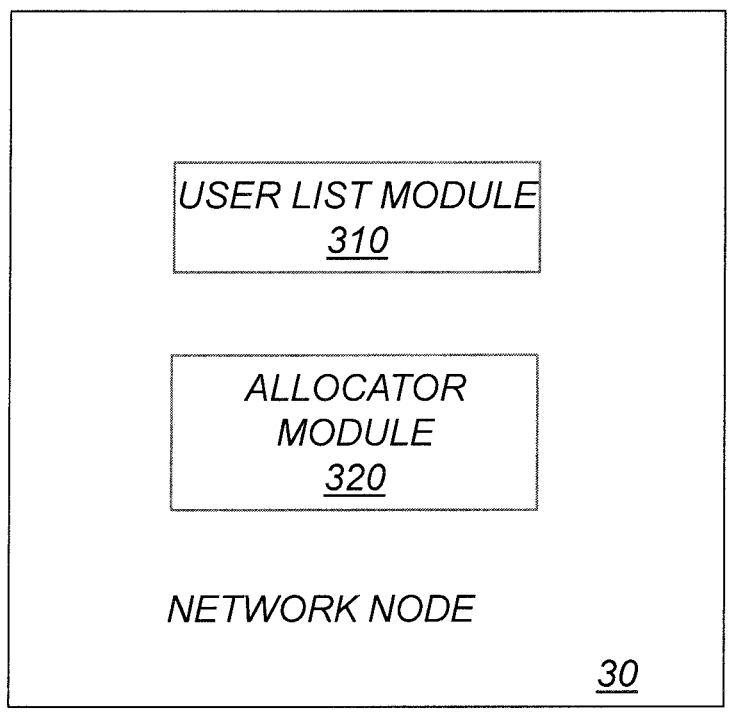
FIG. 13 is a schematic diagram illustrating an embodiment of a network node.

FIG. 13 is a schematic diagram illustrating an example of a network node 30 for time-domain allocation of radio resources in a communication system using beamforming. The network node 30 comprises a UE list module 310, for obtaining a list of UEs to be served. The network node 30 further comprises an allocator module 320, for allocating subcarriers and beam directions of a multi-directional beamform to UEs of said list. The beam direction for each UE covers a position of that UE. The number of allocable subcarriers is limited to fulfil a beam-forming power constraint. The beam-forming power constraint is that the total power of allocated subcarriers, when each allocated subcarrier provides a same effective isotropic radiated power density for a UE as would be provided by a single-directional beamform, will be within a predetermined power budget.

Figure 14:
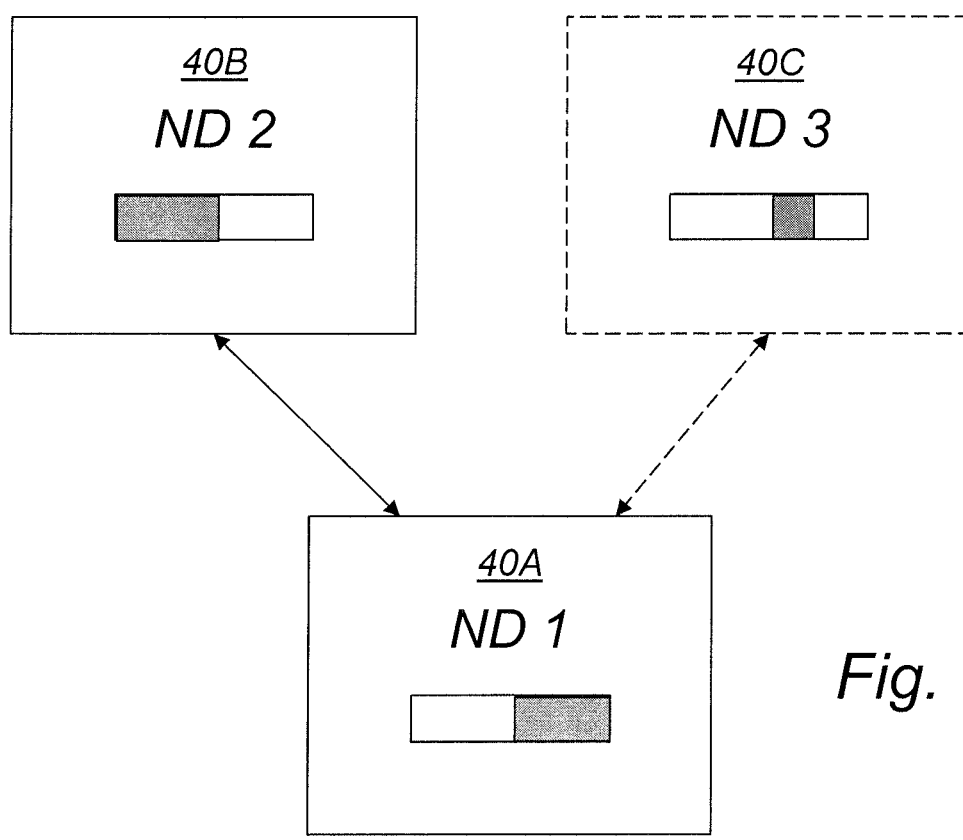
FIG. 14 is a schematic diagram illustrating a general example of functionality distribution or partition.

Alternatively it is possible to realize the module(s) in FIG. 14 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O)

circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

FIG. 14 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 15:
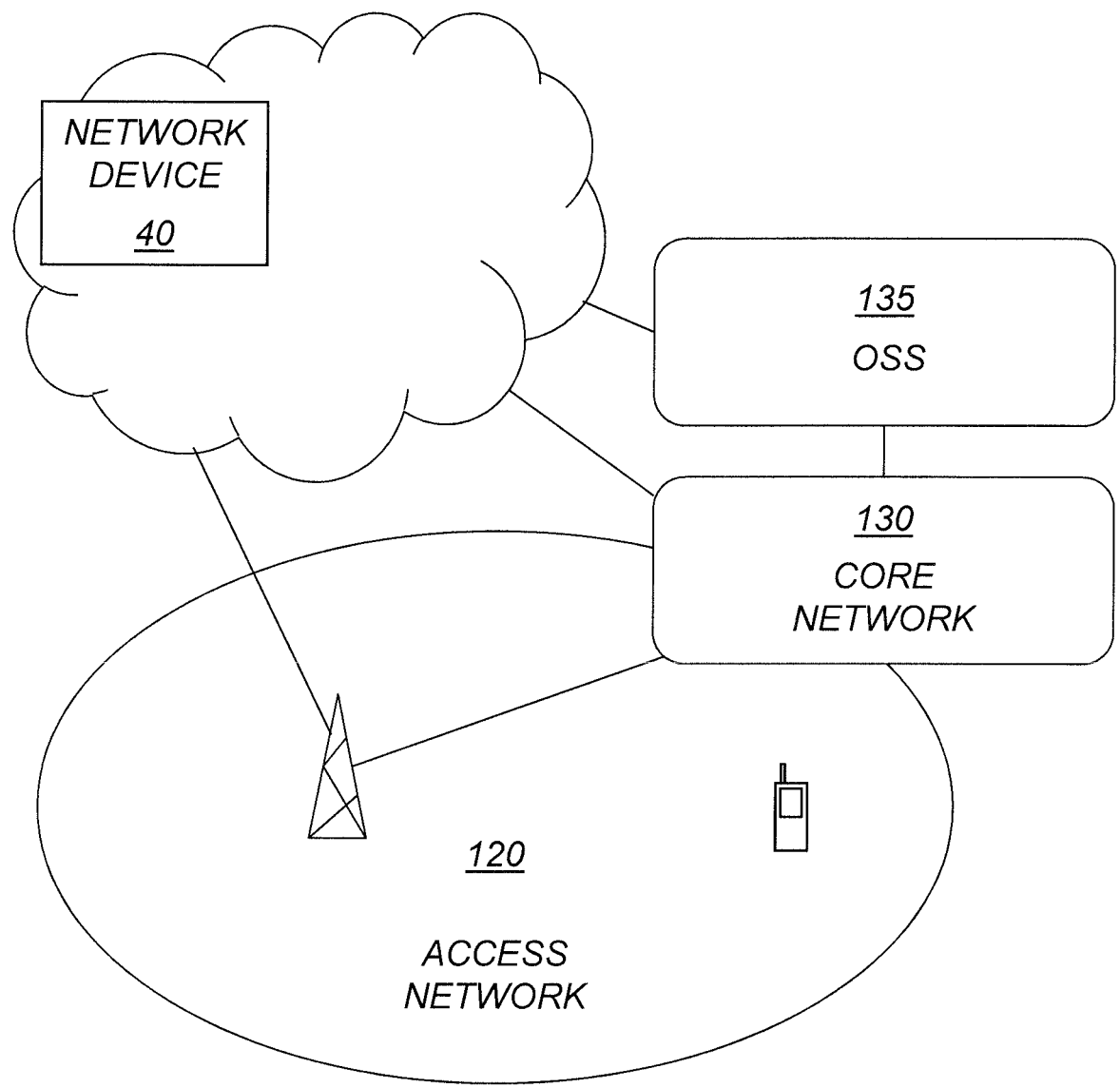
FIG. 15 is a schematic diagram illustrating an example of a wireless communication system in cooperation with one or more cloud-based network devices.

FIG. 15 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 16:
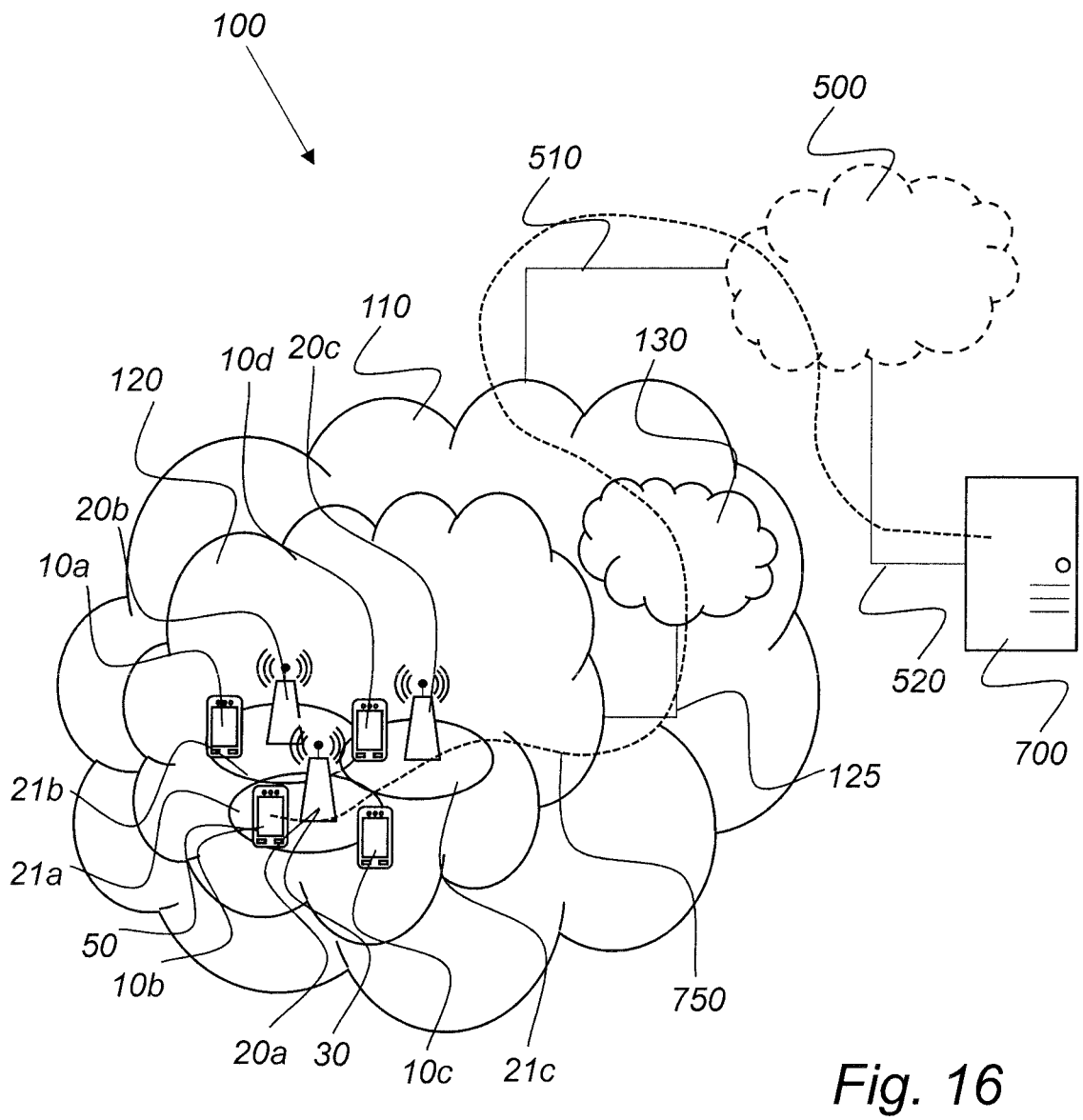
FIG. 16 schematically illustrates a telecommunication network connected via an intermediate network to a host computer.

With reference to FIG. 16, in accordance with an embodiment, a communication system 100 includes a telecommunication network 110, such as a 3GPP-type cellular network, which comprises an access network 120, such as a Radio Access Network (RAN), and a Core Network (CN) 130. The access network 120 comprises a plurality of base stations 20a, 20b, 20c, such as Node Bs (NB), evolved Node Bs (eNB), New Radio Node Bs (gNB) or other types of wireless access points, each defining a corresponding coverage area 21a, 21b, 21c. Each base station 20a, 20b, 20c is connectable to the CN 130 over a wired or wireless connection 125. A first user equipment (UE) 10a located in coverage area 21c is configured to wirelessly connect to, or be paged by, the corresponding base station 20c. A second UE 10b in coverage area 21a is wirelessly connectable to the corresponding base station 20a. While a plurality of UEs 10a-d are illustrated in this example, the disclosed embodiments are equally applicable to a situation where a sole UE is in the coverage area or where a sole UE is connecting to the corresponding base station 20.

The base station 20 is one type of a network node 30. Many operations that in a typical applications are performed in a base station 20 may alternatively be performed in another network node 30 or even in a node external to the telecommunication network 110. The devices and methods described here below as being performed in a base station 20 should be interpreted as also being possible to perform in a general network node 30.

The UE 10 is one type of a wireless device 11. Many operations that in a typical applications are performed in a UE 10 may alternatively be performed in any other wireless device 11. The devices and methods described here below as being performed in a UE 10 should be interpreted as also being possible to perform in a general wireless device 11.

The telecommunication network 110 is itself connected to a host computer 700, which may be embodied in the hardware and/or software of a standalone server, a cloud implemented server, a distributed server or as processing resources in a server farm. The host computer 700 may be under the ownership or control of a service provider, or may be operated by the service provider or on behalf of the service provider. The connections 510, 520 between the telecommunication network 110 and the host computer 700 may extend directly from the CN 130 to the host computer 700 or may go via an optional intermediate network 500. The intermediate network 500 may be one of, or a combination of more than one of, a public, private or hosted network; the intermediate network 500, if any, may be a backbone network or the Internet; in particular, the intermediate network 500 may comprise two or more sub-networks (not shown).

The communication system of FIG. 16 as a whole enables connectivity between one of the connected UEs 10a-d and the host computer 700. The connectivity may be described as an over-the-top (OTT) connection 750. The host computer 700 and the connected UEs 10a-d are configured to communicate data and/or signaling via the OTT connection 750, using the access network 120, the CN 130, any intermediate network 500 and possible further infrastructure (not shown) as intermediaries. The OTT connection 750 may be transparent in the sense that the participating communication devices through which the OTT connection 750 passes are unaware of routing of uplink and downlink communications. For example, a base station 20 may not or need not be informed about the past routing of an incoming downlink communication with data originating from a host computer 700 to be forwarded (e.g., handed over) to a connected UE 10. Similarly, the base station need not be aware of the future routing of an outgoing uplink communication originating from the UE 10 towards the host computer 700.

Example implementations, in accordance with an embodiment, of the UE, base station and host computer discussed in the preceding paragraphs will now be described with reference to FIG. 17. In a communication system 100, a host computer 700 comprises hardware 710 including a communication interface 730 configured to set up and maintain a wired or wireless connection with an interface of a different communication device of the communication system 100. The host computer 700 further comprises processing circuitry 740, which may have storage and/or processing capabilities. In particular, the processing circuitry 740 may comprise one or more programmable processors, application-specific integrated circuits, field programmable gate arrays or combinations of these (not shown) adapted to execute instructions. The host computer 700 further comprises software 720, which is stored in or accessible by the host computer 700 and executable by the processing circuitry 740. The software 720 includes a host application 722. The host application 722 may be operable to provide a service to a remote user, such as a UE 10 connecting via an OTT connection 750 terminating at the UE 10 and the host computer 700. In providing the service to the remote user, the host application 722 may provide user data which is transmitted using the OTT connection 750.

The communication system 100 further includes a base station 20 provided in a telecommunication system and comprising hardware 155 enabling it to communicate with the host computer 700 and with the UE 10. The hardware 155 may include a communication interface 150 for setting up and maintaining a wired or wireless connection with an interface of a different communication device of the communication system 100, as well as a radio interface 160 for setting up and maintaining at least a wireless connection 165 with a UE 10 located in a coverage area (not shown in FIG. 17) served by the base station 20. The communication interface 150 may be configured to facilitate a connection 151 to the host computer 700. The connection 151 may be direct or it may pass through a CN (not shown in FIG. 17) of the telecommunication system and/or through one or more intermediate networks outside the telecommunication system. In the embodiment shown, the hardware 155 of the base station 20 further includes processing circuitry 170, which may comprise one or more programmable processors, application-specific integrated circuits, field programmable gate arrays or combinations of these (not shown) adapted to execute instructions. The base station 20 further has software 156 stored internally or accessible via an external connection.

The communication system 100 further includes the UE 10 already referred to. Its hardware 185 may include a radio interface 180 configured to set up and maintain a wireless connection 165 with a base station serving a coverage area in which the UE 10 is currently located. The hardware 185 of the UE 10 further includes processing circuitry 190, which may comprise one or more programmable processors, application-specific integrated circuits, field programmable gate arrays or combinations of these (not shown) adapted to execute instructions. The UE 10 further comprises software 186, which is stored in or accessible by the UE 10 and executable by the processing circuitry 190. The software 186 includes a client application 192. The client application 192 may be operable to provide a service to a human or non-human user via the UE 10, with the support of the host computer 700. In the host computer 700, an executing host application 722 may communicate with the executing client application 192 via the OTT connection 750 terminating at the UE 10 and the host computer 700. In providing the service to the user, the client application 192 may receive request data from the host application 722 and provide user data in response to the request data. The OTT connection 750 may transfer both the request data and the user data. The client application 192 may interact with the user to generate the user data that it provides.

Figure 17:
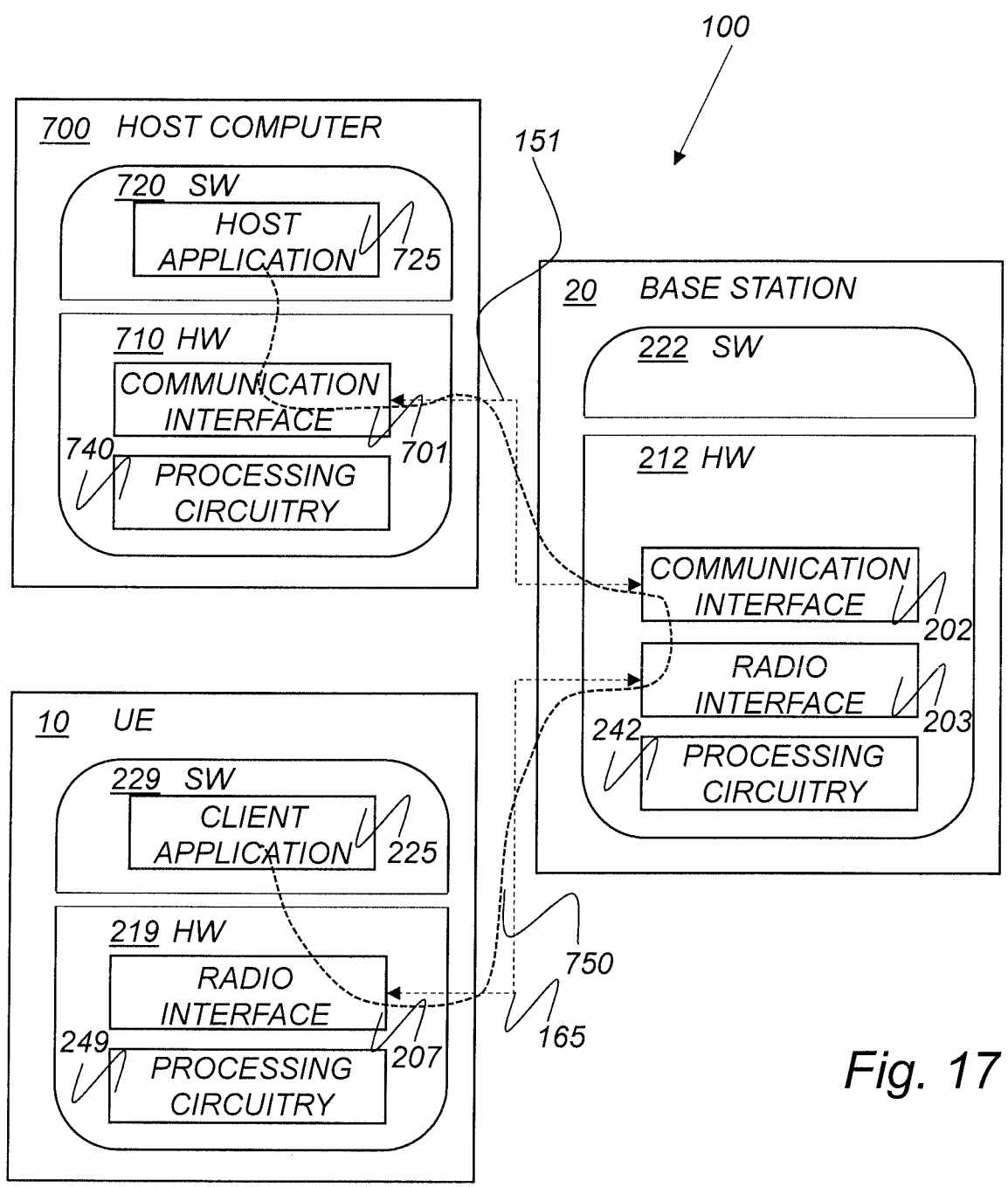
FIG. 17 is a generalized block diagram of a host computer communicating via a base station with a user equipment over a partially wireless connection.

It is noted that the host computer 700, base station 20 and UE 10 illustrated in FIG. 17 may be identical to the host computer 700, one of the base stations 20a, 20b, 20c and one of the UEs 10a-d of FIG. 16, respectively. This is to say, the inner workings of these entities may be as shown in FIG. 17 and independently, the surrounding network topology may be that of FIG. 16.

In FIG. 17, the OTT connection 750 has been drawn abstractly to illustrate the communication between the host computer 700 and the use equipment via the base station 20, without explicit reference to any intermediary devices and the precise routing of messages via these devices. Network infrastructure may determine the routing, which it may be configured to hide from the UE 10 or from the service provider operating the host computer 700, or both. While the OTT connection 750 is active, the network infrastructure may further take decisions by which it dynamically changes the routing (e.g., on the basis of load balancing consideration or reconfiguration of the network).

The wireless connection 165 between the UE 10 and the base station 20 is in accordance with the teachings of the embodiments described throughout this disclosure. One or more of the various embodiments improve the performance of OTT services provided to the UE 10 using the OTT connection 700, in which the wireless connection 165 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 750 between the host computer 700 and UE 10, in response to variations in the measurement results. The measurement procedure and/or the network functionality for reconfiguring the OTT connection 750 may be implemented in the software 720 of the host computer 700 or in the software 186 of the UE 10, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 720, 186 may compute or estimate the monitored quantities. The reconfiguring of the OTT connection 750 may include message format, retransmission settings, preferred routing etc.; the reconfiguring need not affect the base station 20, and it may be unknown or imperceptible to the base station 20. Such procedures and functionalities may be known and practiced in the art. In certain embodiments, measurements may involve proprietary UE signaling facilitating the host computer's 700 measurements of throughput, propagation times, latency and the like. The measurements may be implemented in that the software 720 causes messages to be transmitted, in particular empty or 'dummy' messages, using the OTT connection 750 while it monitors propagation times, errors etc.

Figure 18:
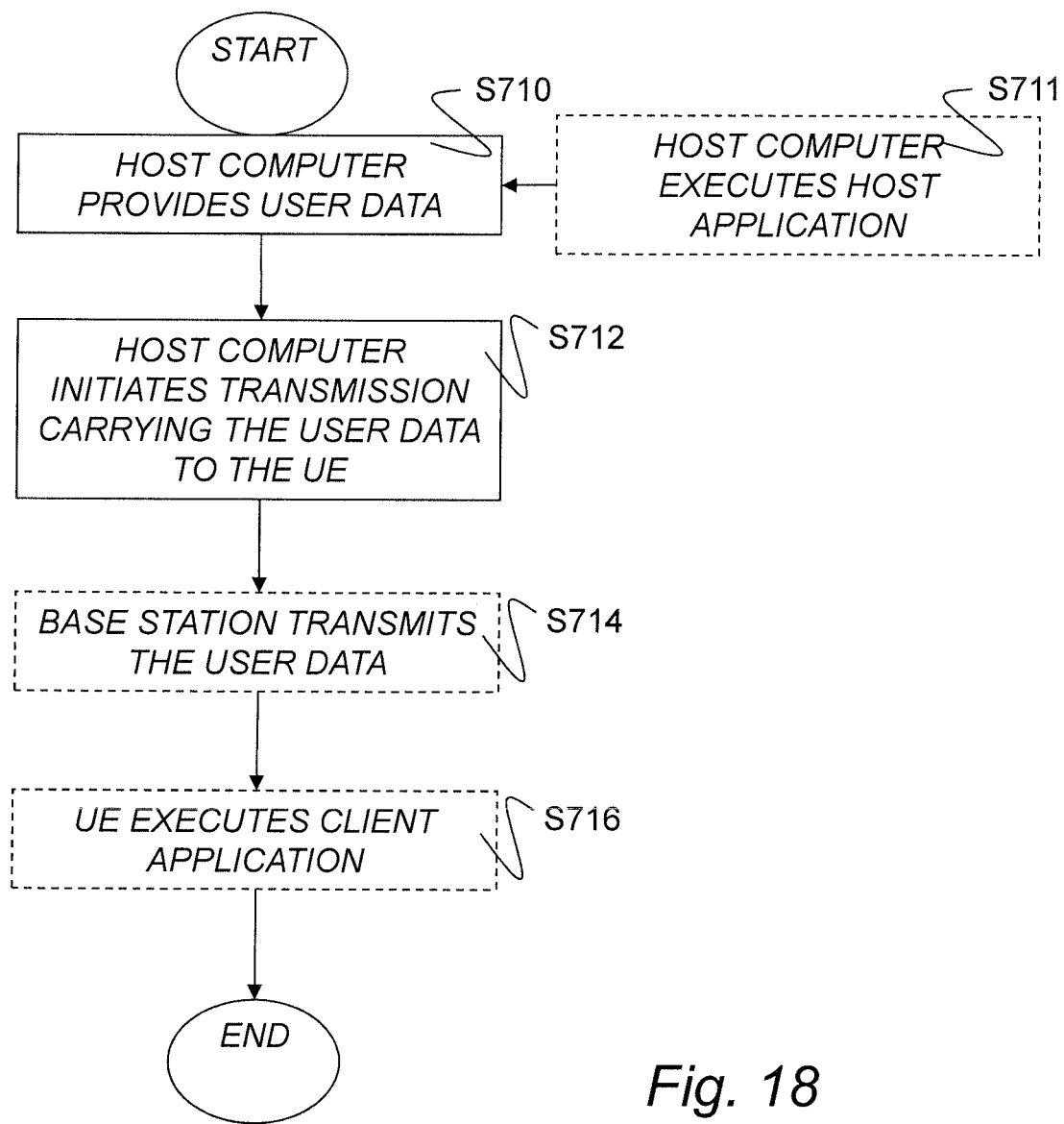
FIGS. 18-21 are flowcharts illustrating methods implemented in a communication system including a host computer, a base station and a user equipment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In a first step S710 of the method, the host computer provides user data. In an optional substep S711 of the first step S710, the host computer provides the user data by executing a host application. In a second step S712, the host computer initiates a transmission carrying the user data to the UE. In an optional third step S714, the base station transmits to the UE the user data which was carried in the transmission that the host computer initiated, in accordance with the teachings of the embodiments described throughout this disclosure. In an optional fourth step S716, the UE executes a client application associated with the host application executed by the host computer.

Figure 19:
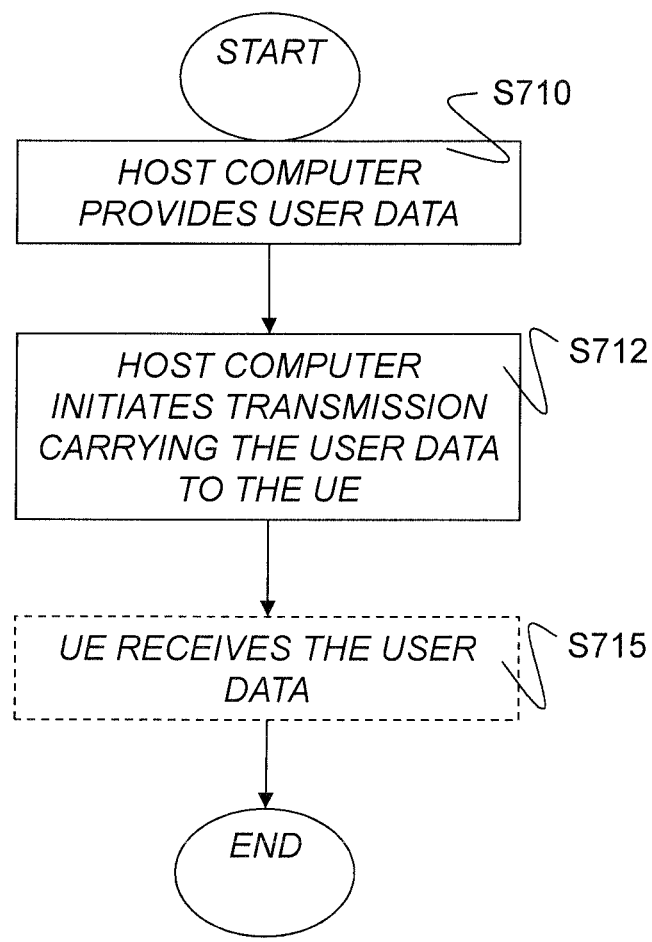

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In a first step S710 of the method, the host computer provides user data. In an optional substep (not shown) the host computer provides the user data by executing a host application. In a second step S712, the host computer initiates a transmission carrying the user data to the UE. The transmission may pass via the base station, in accordance with the teachings of the embodiments described throughout this disclosure. In an optional third step S715, the UE receives the user data carried in the transmission.

Figure 20:
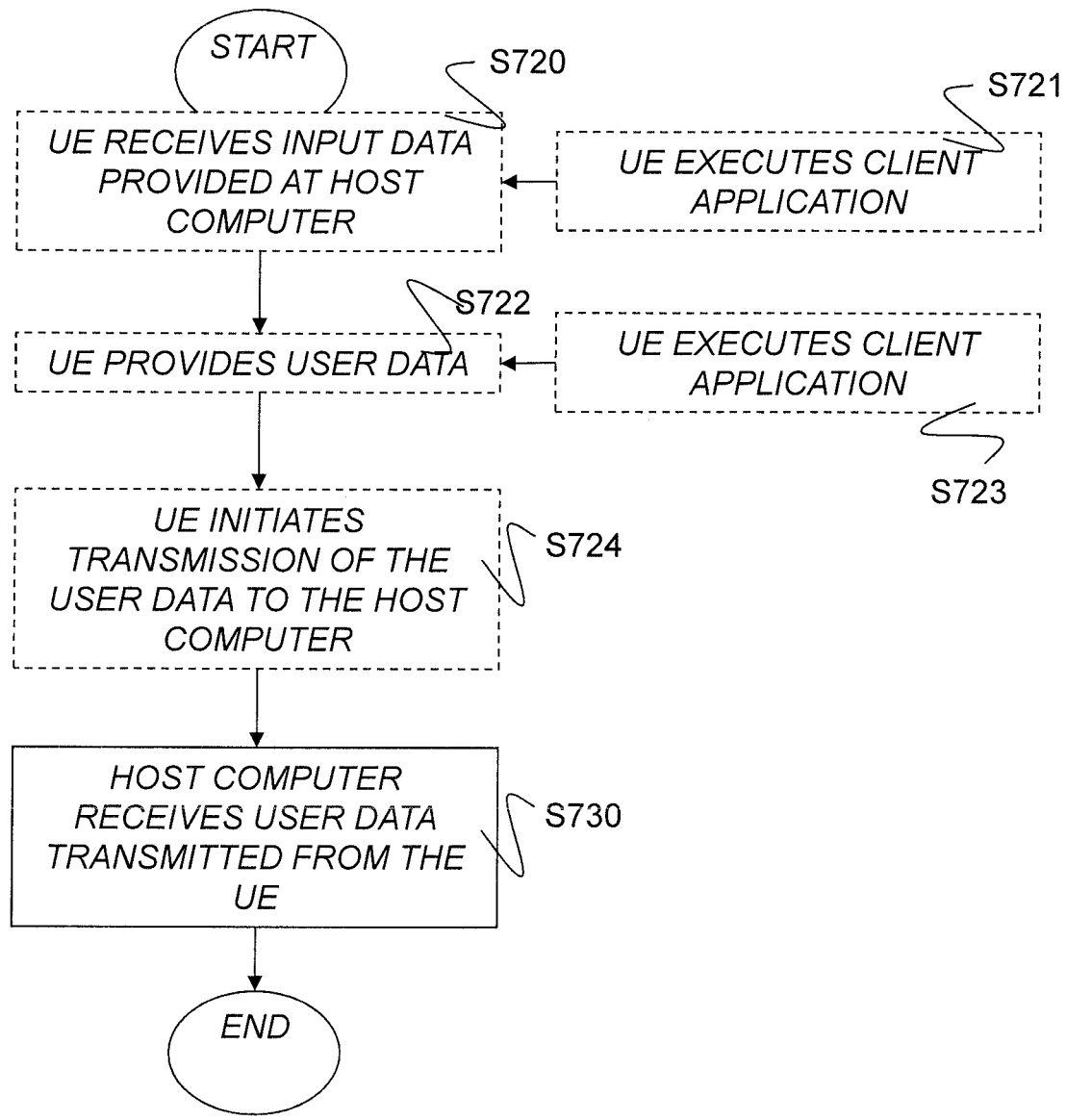

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In an optional first step S720 of the method, the UE receives input data provided by the host computer. Additionally or alternatively, in an optional second step S722, the UE provides user data. In an optional substep S723 of the second step S722, the UE provides the user data by executing a client application. In a further optional substep S721 of the first step S720, the UE executes a client application which provides the user data in reaction to the received input data provided by the host computer. In providing the user data, the executed client application may further consider user input received from the user. Regardless of the specific manner in which the user data was provided, the UE initiates, in an optional third substep S724, transmission of the user data to the host computer. In a fourth step S730 of the method, the host computer receives the user data transmitted from the UE, in accordance with the teachings of the embodiments described throughout this disclosure.

Figure 21:
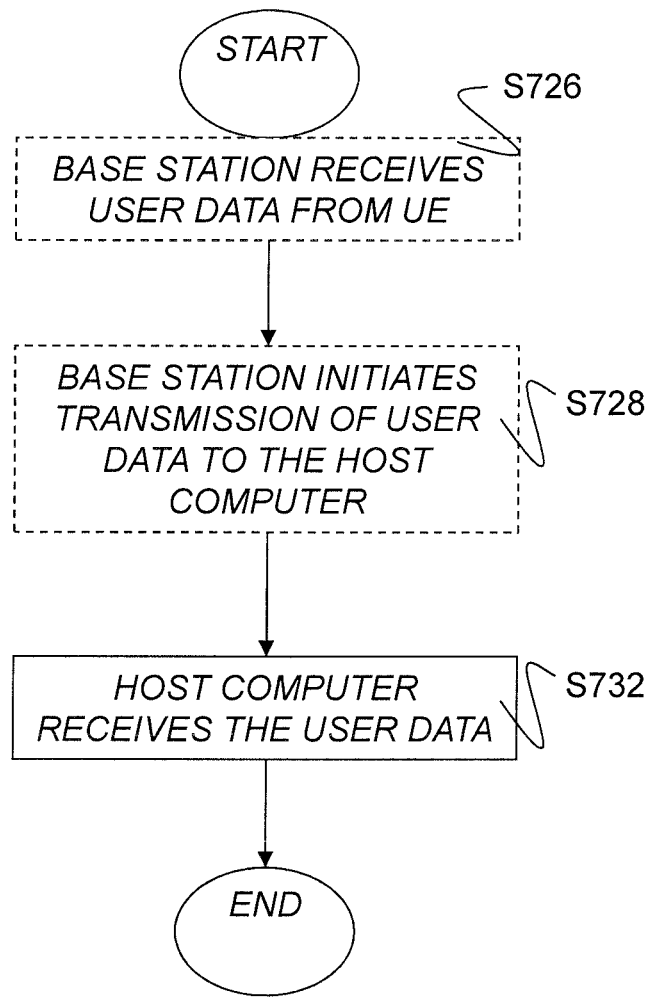

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In an optional first step S726 of the method, in accordance with the teachings of the embodiments described throughout this disclosure, the base station receives user data from the UE. In an optional second step S728, the base station initiates transmission of the received user data to the host computer. In a third step S732, the host computer receives the user data carried in the transmission initiated by the base station.

Numbered Embodiments

1. A network node configured to communicate with a wireless device, the network node comprising a radio interface and processing circuitry configured to obtain a list of wireless devices to be served and to allocate subcarriers and beam directions of a multi-directional beamform to wireless devices of the list; said beam direction for each wireless device covers a position of that wireless device; wherein the number of allocable subcarriers is limited to fulfil a beam-forming power constraint; said beam-forming power constraint is that the total power of allocated subcarriers, when each allocated subcarrier provides a same effective isotropic radiated power density for a wireless device as would be provided by a single-directional beamform, will be within a predetermined power budget.

2. The network node of embodiment 1, wherein the network node is a base station.

3. A communication system including a host computer comprising:
   processing circuitry configured to provide user data; and
   a communication interface configured to forward the user data to a cellular network for transmission to a wireless device,
   wherein the cellular network comprises a network node having a radio interface and processing circuitry, the processing circuitry of the network node being configured to obtain a list of wireless devices to be served and to allocate subcarriers and beam directions of a multi-directional beamform to wireless devices of the list; said beam direction for each wireless device covers a position of that wireless device; wherein the number of allocable subcarriers is limited to fulfil a beam-forming power constraint; said beam-forming power constraint is that the total power of allocated subcarriers, when each allocated subcarrier provides a same effective isotropic radiated power density for a wireless device as would be provided by a single-directional beamform, will be within a predetermined power budget.

4. The communication system of embodiment 3, further including the network node.

5. The communication system of embodiment 4, further including the wireless device, wherein the wireless device is configured to communicate with the network node.

6. The communication system of embodiment 5, wherein:
   the processing circuitry of the host computer is configured to execute a host application, thereby providing the user data; and
   the wireless device comprises processing circuitry configured to execute a client application associated with the host application.

7. The communication system of any of the embodiments 3 to 6, wherein the wireless device is a user equipment.

8. The communication system of any of the embodiments 3 to 7, wherein the network node is a base station.

9. A method implemented in a network node, comprising obtaining of a list of wireless devices to be served, and allocating subcarriers and beam directions of a multi-directional beamform to wireless devices of said list; wherein said beam direction for each wireless device covers a position of that wireless device; wherein the number of allocable subcarriers is limited to fulfil a beam-forming power constraint; said beam-forming power constraint being that the total power of allocated subcarriers, when each allocated subcarrier provides a same effective isotropic radiated power density for a wireless device as would be provided by a single-directional beamform, will be within a predetermined power budget.

10. A method implemented in a communication system including a host computer, a network node and a wireless device, the method comprising:
   at the host computer, providing user data; and
   at the host computer, initiating a transmission carrying the user data to the wireless device via a cellular network comprising the network node, wherein the network node obtains a list of wireless devices to be served, and allocates subcarriers and beam directions of a multi-directional beamform to wireless devices of said list; wherein said beam direction for each wireless device covers a position of that wireless device; wherein the number of allocable subcarriers is limited to fulfil a beam-forming power constraint; said beam-forming power constraint being that the total power of allocated subcarriers, when each allocated subcarrier provides a same effective isotropic radiated power density for a wireless device as would be provided by a single-directional beamform, will be within a predetermined power budget.

11. The method of embodiment 10, further comprising:
   at the network node, transmitting the user data.

12. The method of embodiment 11, wherein the user data is provided at the host computer by executing a host application, the method further comprising:
   at the wireless device, executing a client application associated with the host application.

13. The method of any of the embodiments 9 to 12, wherein the wireless device is a user equipment.

14. The method of any of the embodiments 9 to 13, wherein the network node is a base station.

15. A network node configured to communicate with a wireless device, the network node comprising a radio interface and processing circuitry configured to obtain a list of wireless devices to be served and to allocate subcarriers and beam directions of a multi-directional beamform to wireless devices of said list; wherein said beam direction for each wireless device covers a position of that wireless device; wherein the processing circuitry is further configured to request a change in transmitting power of the wireless devices of $$\Delta N_{bfgain}$$

in each allocable subcarrier when transmitting at a multi-directional beamform, where $\Delta N_{bfgain}=10 \log N_{bf}$ corresponds to the difference in beamforming gain between said multi-directional beamform in a present time slot and the beamforming gain of a single-directional beamform.

16. The network node of embodiment 15, wherein the network node is a base station.

17. The network node of embodiment 15 or 16, wherein the wireless device is a user equipment.

18. A communication system including a host computer comprising a communication interface configured to receive user data originating from a transmission from a wireless device to a network node, wherein the network node comprises a radio interface and processing circuitry, the processing circuitry of the network node being configured to obtain a list of wireless devices to be served and to allocate subcarriers and beam directions of a multi-directional beamform to wireless devices of said list; wherein said beam direction for each wireless device covers a position of that wireless device; wherein the processing circuitry of the network node is further configured to request a change in transmitting power of the wireless devices of $\Delta N_{bfgain}$ in each allocable subcarrier when transmitting at a multi-directional beamform, where $\Delta N_{bfgain}=10 \log N_{bf}$ corresponds to the difference in beamforming gain between said multi-directional beamform in a present time slot and the beamforming gain of a single-directional beamform.

19. The communication system of embodiment 18, further including the network node.

20. The communication system of embodiment 19, further including the wireless device, wherein the wireless device is configured to communicate with the network node.

21. The communication system of embodiment 20, wherein:
   the processing circuitry of the host computer is configured to execute a host application;
   the wireless device is configured to execute a client application associated with the host application, thereby providing the user data to be received by the host computer.

22. The communication system of any of the embodiments 18 to 21, wherein the network node is a base station.

23. The communication system of any of the embodiments 18 to 22, wherein the wireless device is a user equipment.

24. A method implemented in a network node, comprising obtaining of a list of wireless devices to be served and allocating of subcarriers and beam directions of a multi-directional beamform to wireless devices of said list; wherein said beam direction for each wireless device covers a position of that wireless device; said method further comprising requesting a change in transmitting power of the wireless devices of $\Delta N_{bfgain}$ in each allocable subcarrier when transmitting at a multi-directional beamform, where $\Delta N_{bfgain}=10 \log N_{bf}$ corresponds to the difference in beamforming gain between said multi-directional beamform in a present time slot and the beamforming gain of a single-directional beamform.

25. A method implemented in a communication system including a host computer, a network node and a wireless device, the method comprising:
   at the host computer, receiving, from the base station, user data originating from a transmission which the network node has received from the wireless device, wherein the wireless device obtains of a list of wireless devices to be served and allocates of subcarriers and beam directions of a multi-directional beamform to wireless devices of said list; wherein said beam direction for each wireless device covers a position of that wireless device; said wireless device further requests a change in transmitting power of the wireless devices of $\Delta N_{bfgain}$ in each allocable subcarrier when transmitting at a multi-directional beamform, where $\Delta N_{bfgain}=10 \log N_{bf}$ corresponds to the difference in beamforming gain between said multi-directional beamform in a present time slot and the beamforming gain of a single-directional beamform.

26. The method of embodiment 25, further comprising:
   at the network node, receiving the user data from the wireless device.

27. The method of embodiment 26, further comprising:
   at the network node, initiating a transmission of the received user data to the host computer.

28. The method of any of the embodiments 24 to 27, wherein the wireless device is a user equipment.

29. The method of any of the embodiments 24 to 28, wherein the network node is a base station.

ABBREVIATIONS

AAS Advanced Antenna Systems
ASIC Application Specific Integrated Circuits
BF beamforming
BTS Base Transceiver Stations
CD Compact Disc
CN Core Network
COTS Common Off-The-Shelf
CPE Customer Premises Equipment
CPU Central Processing Units
CSI-RS Channel State Information Reference Signal
DMRS Demodulation Reference Signals
DSP Digital Signal Processors
DVD Digital Versatile Disc
EIRP Effective Isotropic Radiated Power
eNB evolved Node B
FPGA Field Programmable Gate Arrays
gNB New Radio Node B
HDD Hard Disk Drive
HW hardware
I/O input/output
IoT Internet of Things
LEE Laptop Embedded Equipment
LME Laptop Mounted Equipment
MEM memory units
NB Node B
ND Network Device
NFV Network Function Virtualization
NI Network Interfaces
NIC Network Interface Controller
NR New Radio
OFDM Orthogonal Frequency-Division Multiplexing
OS Operating System
OSS Operations and Support System
PC Personal Computer
PDA Personal Digital Assistant
PDSCH Physical Downlink Shared Channel
PLC Programmable Logic Controllers
PRB Physical Resource Block
RAM Random Access Memory
RAN Radio Access Network
REG registers
ROM Read-Only Memory
RRU Remote Radio Units
SINR Signal to Interference and Noise Ratio
SSB Synchronization Signal Block
STA Station
SW software
UE User Equipment
USB Universal Serial Bus
VM Virtual Machine
VMM Virtual Machine Monitor
VNE Virtual Network Element
WNIC Wireless Network Interface Controller

The invention claimed is:

1. A method for time-domain allocation of radio resources in a communication system using beamforming, said method comprising:
obtaining a list of wireless devices to be served;
allocating subcarriers as allocable subcarriers and a respective beam direction from beam directions of a multi-directional beamform to each wireless device of said list;
wherein said respective beam direction for each wireless device covers a position of that wireless device;
wherein a number of the allocable subcarriers is limited to fulfil a beam-forming power constraint; and
wherein said beam-forming power constraint is set so that a total power of the allocable subcarriers is within a predetermined power budget, based on each allocable subcarrier providing a same effective isotropic radiated power (EIRP) density for a respective wireless device in the respective direction of the multi-directional beamform as would be provided to the respective wireless device if by a single-directional beamform.

2. The method according to claim 1, wherein said allocating subcarriers and beam directions is performed for downlink transmission.

3. The method according to claim 2, wherein said number of allocable subcarriers is selected to be at most equal to a total number of subcarriers multiplied by a relative beamforming gain in the directions of the wireless devices.

4. The method according to claim 2, wherein said beamforming power constraint is expressed as:

$$N_{sc} \times 1/G_{bf} \times P_{sc} \le P_{tot},$$

where $N_{sc}$ is the number of allocable subcarriers, $G_{bf}$ is a beamforming gain relative to a beamforming gain of a single-directional beamform in directions of the wireless devices, $P_{sc}$ the effective isotropic radiated power density per subcarrier and $P_{tot}$ is said predetermined power budget.

5. The method according to claim 2, wherein said number of allocable subcarriers is selected to be at most equal to a total number of subcarriers divided by a number of beam directions applied in said multi-directional beamform.

6. The method according to claim 2, wherein said beamforming power constraint is expressed as:

$$N_{sc} \times N_{bf} \times P_{sc} \le P_{tot},$$

where $N_{sc}$ is the number of allocable subcarriers;
where $N_{bf}$ is a number of beam directions applied in said multi-directional beamform;
where $P_{sc}$ is the EIRP density per subcarrier; and
where $P_{tot}$ is the predetermined power budget.

7. The method according to claim 2, wherein said number of allocable subcarriers is selected dependent on a normalized factor of inner products of vectors of beamforming weight per antenna element of the multi-directional beamform and vectors of beamforming weight per antenna element of a corresponding single-directional beamform.

8. The method according to claim 2, wherein said beamforming power constraint is expressed as:

$$\max_{x} N_{sc} \frac{|w_{MU}|^2 |w_{UEx}|^2}{|w_{MU}^H w_{UEx}|^2} P_{sc} \le P_{tot},$$

where $N_{sc}$ is the number of allocable subcarriers, $w_{MU}$ is a vector of beamforming weight per antenna element of the multi-directional beamform, $w_{UEx}$ are vectors of beamforming weight per antenna element of a corresponding single-directional beamform serving wireless device x, $P_{sc}$ is the effective isotropic radiated power density per subcarrier and $P_{tot}$ is said predetermined power budget.

9. The method according to claim 2, wherein said beamforming power constraint is expressed as:

$$N_{sc} \frac{1}{N_{users}} \sum_{x=1}^{N_{users}} \frac{|w_{MU}|^2 |w_{UEx}|^2}{|w_{MU}^H w_{UEx}|^2} P_{sc} \leq P_{tot},$$

where $N_{users}$ is a number of wireless devices, served in said multi-directional beamform, $N_{sc}$ is the number of allocable subcarriers, $w_{MU}$ is a vector of beamforming weight per antenna element of the multi-directional beamform, $w_{UEx}$ are vectors of beamforming weight per antenna element of a corresponding single-directional beamform serving wireless device x, $P_{sc}$ is the effective isotropic radiated power density per subcarrier and $P_{tot}$ is said predetermined power budget.

10. The method according to claim 1, wherein for uplink transmission, further comprising:
requesting a change in transmitting power of a respective wireless device of $\Delta N_{bfgain}$ in each allocable subcarrier when transmitting using multi-directional beamform, where $N_{bf}$ is a number of beam directions applied in said multi-directional beamform and where $\Delta N_{bfain}=10 \log N_{bf}$ corresponds to a difference in beamforming gain for the respective wireless device between said multi-directional beamform in a present time slot and beamforming gain if by a single-directional beamform.

11. The method according to claim 10, wherein for uplink transmission, the number of allocable subcarriers is limited to fulfil said beam-forming power constraint.

12. The method according to claim 11, wherein said limitation of the number of allocable subcarriers in uplink transmission is performed in dependence of available transmitting power of said wireless devices.

13. The method according to claim 1, wherein the allocating the subcarriers as allocable carriers further comprising:
allocating a set of subcarriers and a beam direction for use in a single-directional beamform to a first wireless device of said wireless devices;
determining an associated beam direction of a next wireless device of said list of wireless devices;
allocating, when said associated beam direction of said next wireless device coincides with a beam direction of a current beamform and a number of allocable non-allocated subcarriers fulfils requests of said next wireless device, subcarriers, and beam direction of a current beamform to said next wireless device;
selecting, when said associated beam direction of said next wireless device does not coincide with a beam direction of a current beamform, a tentative new multi-directional beamform having beam directions covering all allocated wireless devices as well as said next wireless device; and
wherein, when said tentative new multi-directional beamform is selected, said allocating subcarriers and beam directions of the multi-directional beamform to said wireless devices is performed with said tentative new multi-directional beamform, when a number of allocable subcarriers of said tentative new multi-directional beamform fulfilling said beam-forming power constraint is larger or equal to the subcarrier requests of said allocated wireless devices and said next wireless device.

14. The method according to claim 13, wherein by repeating said determining, and either said allocating subcarriers and beam direction of a current beamform to said next wireless device or said selecting a tentative new multi-directional beamform, until a number of allocable subcarriers is smaller than the subcarrier requests of said allocated wireless devices and said next wireless device.

15. A network node for time-domain allocation of radio resources in a communication system using beamforming comprising:
a processor; and
a memory comprising instructions which, when executed by the processor, cause the network node to:
obtain a list of wireless devices to be served;
allocate subcarriers as allocable subcarriers and a respective beam direction from beam directions of a multi-directional beamform to each wireless device of said list;
wherein said respective beam direction for each wireless device covers a position of that wireless device;
wherein a number of the allocable subcarriers is limited to fulfil a beam-forming power constraint; and
wherein said beam-forming power constraint is set so that a total power of the allocable subcarriers is within a predetermined power budget, based on each allocable subcarrier to provide a same effective isotropic radiated power (EIRP) density for a respective wireless device in the respective direction of the multi-directional beamform as would be provided to the respective wireless device if by a single-directional beamform.

16. A non-transitory computer-readable storage medium comprising instructions which, when executed by at least one processor, cause a network node to perform operations for time-domain allocation of radio resources in a communication system using beamforming comprising:
obtaining a list of wireless devices to be served;
allocating subcarriers as allocable subcarriers and a respective beam direction form beam directions of a multi-directional beamform to each wireless device of said list;
wherein said respective beam direction for each wireless device covers a position of that wireless device;
wherein a number of the allocable subcarriers is limited to fulfil a beam-forming power constraint; and
wherein said beam-forming power constraint is set so that a total power of the allocable subcarriers is within a predetermined power budget, based on each allocable subcarrier providing a same effective isotropic radiated power (EIRP) density for a respective wireless device in the respective direction of the multi-directional beamform as would be provided to the respective wireless device if by a single-directional beamform.

* * * * *